US005871887A

United States Patent [19]
Trokhan et al.

[11] Patent Number: 5,871,887
[45] Date of Patent: Feb. 16, 1999

[54] WEB PATTERNING APPARATUS COMPRISING A FELT LAYER AND A PHOTOSENSITIVE RESIN LAYER

[75] Inventors: Paul Dennis Trokhan, Hamilton; Dean Van Phan, West Chester, both of Ohio

[73] Assignee: The Procter & Gamble Company, Cincinnati, Ohio

[21] Appl. No.: 822,205

[22] Filed: Mar. 20, 1997

Related U.S. Application Data

[63] Continuation-in-part of Ser. No. 736,875, Oct. 25, 1996, Pat. No. 5,674,663, which is a continuation of Ser. No. 388,948, Feb. 15, 1995, abandoned, which is a continuation of Ser. No. 463,348, Jun. 5, 1995, which is a continuation-in-part of Ser. No. 268,154, Jun. 29, 1994, abandoned.

[51] Int. Cl.$^6$ .................................................. G03F 7/30
[52] U.S. Cl. .......................... 430/320; 442/76; 442/320; 162/116; 162/348; 162/358.1; 162/900; 162/903
[58] Field of Search ............................... 430/320; 442/76, 442/320; 162/116, 348, 358.1, 900, 903

[56] References Cited

U.S. PATENT DOCUMENTS

| Re. 32,713 | 7/1988 | Woo ........................................ 428/240 |
|---|---|---|
| D. 239,137 | 3/1976 | Appleman ............................... D59/2 A |
| D. 354,853 | 1/1995 | Schulz ...................................... D5/53 |
| D. 354,854 | 1/1995 | Schulz ...................................... D5/53 |
| D. 354,855 | 1/1995 | Schulz ...................................... D5/53 |
| D. 354,856 | 1/1995 | Schulz ...................................... D5/53 |
| 3,414,459 | 12/1968 | Wells ...................................... 161/131 |
| 3,537,954 | 11/1970 | Justus ...................................... 162/305 |

(List continued on next page.)

FOREIGN PATENT DOCUMENTS

| 1099588 | 4/1981 | Canada .............................. B30B 9/20 |
|---|---|---|
| 0604824 A1 | 7/1994 | European Pat. Off. ......... D21F 11/00 |
| 0 616 074 A1 | 9/1994 | European Pat. Off. ......... D21F 11/00 |
| 2 254 288 | 10/1992 | United Kingdom .............. B32B 3/24 |
| WO 91/14558 | 10/1991 | WIPO ............................ B29C 41/28 |
| WO 92/17643 | 10/1992 | WIPO ............................... D21F 7/08 |
| WO 94/04750 | 3/1994 | WIPO ............................ D21F 11/00 |
| WO 94/06623 | 3/1994 | WIPO ............................... B31F 1/07 |

OTHER PUBLICATIONS

Article entitled "Photocross–Linkable Resin Systems" written by Green et al., J. Macro–Sci Revs. Macro Chem., C21 (2), 187–273 (1981–82).
Article entitled "Ultraviolet Curable Flexible Coatings" written by Schmidle, J. of Coated Fabrics, 8, 10–20 (Jul., 1978).
Article entitled "A Review of Ultraviolet Curing Technology" written by Bayer, Tappi Paper Synthetics Conf. Proc., Sep. 25–27, 1978, pp. 167–172.

*Primary Examiner*—Bernard P. Codd
*Attorney, Agent, or Firm*—Jay A. Krebs; Larry L. Huston; Gerry S. Gressel

[57] ABSTRACT

The invention comprises an apparatus for use in making a web of papermaking fibers. The apparatus comprising: a dewatering felt layer having a first web facing felt surface at a first elevation and a second oppositely facing felt surface, and a web patterning layer comprising a photosensitive resin. The patterning layer penetrates the first felt surface, and extends from the first felt surface to form a web contacting top surface at a second elevation different from the first elevation. The invention also comprises a method of forming a web support apparatus having a felt layer and a web patterning layer.

14 Claims, 12 Drawing Sheets

U.S. PATENT DOCUMENTS

| | | | |
|---|---|---|---|
| 3,549,742 | 12/1970 | Benz | 264/250 |
| 3,556,907 | 1/1971 | Nystrand | 156/470 |
| 3,867,225 | 2/1975 | Nystrand | 156/209 |
| 3,994,771 | 11/1976 | Morgan, Jr. et al. | 162/113 |
| 4,139,410 | 2/1979 | Tapio et al. | 162/206 |
| 4,144,124 | 3/1979 | Turunen et al. | 162/290 |
| 4,191,609 | 3/1980 | Trokhan | 162/113 |
| 4,239,065 | 12/1980 | Trokhan | 139/383 A |
| 4,250,172 | 2/1981 | Mutzenberg et al. | 428/234 |
| 4,309,246 | 1/1982 | Hulit et al. | 162/113 |
| 4,390,574 | 6/1983 | Wood | 428/36 |
| 4,446,187 | 5/1984 | Eklund | 428/136 |
| 4,464,432 | 8/1984 | Dost et al. | 428/280 |
| 4,514,345 | 4/1985 | Johnson et al. | 264/22 |
| 4,528,239 | 7/1985 | Trokhan | 428/247 |
| 4,533,437 | 8/1985 | Curran et al. | 162/281 |
| 4,637,859 | 1/1987 | Trokhan | 162/109 |
| 4,740,409 | 4/1988 | Lefkowitz | 428/131 |
| 4,795,480 | 1/1989 | Boyer et al. | 51/296 |
| 4,973,383 | 11/1990 | Filzen | 162/358 |
| 5,062,924 | 11/1991 | McCarten et al. | 162/358 |
| 5,098,522 | 3/1992 | Smurkoski et al. | 162/358 |
| 5,126,015 | 6/1992 | Pounder | 162/206 |
| 5,217,799 | 6/1993 | Sumii et al. | 428/280 |
| 5,236,778 | 8/1993 | Landis et al. | 428/282 |
| 5,245,025 | 9/1993 | Trokhan et al. | 536/56 |
| 5,275,700 | 1/1994 | Trokhan | 162/358.1 |
| 5,277,761 | 1/1994 | Van Phan et al. | 162/109 |
| 5,292,626 | 3/1994 | Buhr et al. | 430/331 |
| 5,328,565 | 7/1994 | Rasch et al. | 162/113 |
| 5,334,289 | 8/1994 | Trokhan et al. | 162/358.2 |
| 5,336,373 | 8/1994 | Scattolino et al. | 162/116 |
| 5,346,567 | 9/1994 | Barnewall | 156/78 |
| 5,569,358 | 10/1996 | Cameron | 162/117 |
| 5,674,663 | 10/1997 | McFarland et al. | 430/320 |

WEB PATTERNING APPARATUS COMPRISING A FELT LAYER AND A PHOTOSENSITIVE RESIN LAYER

This application is continuation-in-part of application Ser. No. 736,875, filed Oct. 25, 1996, U.S. Pat. No. 5,674,663, which is a continuation of application Ser. No. 388,948, filed Feb. 15, 1995, now abandoned which is a continuation of application Ser. No. 08/463,348, filed on Jun. 5, 1995 which is a continuation in part application of U.S. patent application Ser. No. 08/268,154 filed Jun. 29, 1994, now abandoned, in the name of Trokhan et al.

FIELD OF THE INVENTION

The present invention relates to a web patterning apparatus having a felt layer and a photosensitive resin layer and a method for making such an apparatus.

BACKGROUND OF THE INVENTION

Paper structures, such as toilet tissue, paper towels, and facial tissue, are widely used throughout the home and industry. Many attempts have been made to make such tissue products more consumer preferred. One approach to providing consumer preferred tissue products having bulk and flexibility is illustrated in U.S. Pat. No. 3,994,771 issued Nov. 30, 1976 to Morgan et al. Improved bulk and flexibility may also be provided through bilaterally staggered compressed and uncompressed zones, as shown in U.S. Pat. No. 4,191,609 issued Mar. 4, 1980 to Trokhan.

Another approach to making tissue products more consumer preferred is to dry the paper structure to impart greater bulk, tensile strength, and burst strength to the tissue products. Examples of paper structures made in this manner are illustrated in U.S. Pat. No. 4,637,859 issued Jan. 20, 1987 to Trokhan. Alternatively, a paper structure can be made stronger, without utilizing more cellulosic fibers, by having regions of differing basis weights as illustrated in U.S. Pat. No. 4,514,345 issued Apr. 30, 1985.

Tissue paper manufacturers have also attempted to make tissue products more appealing to consumers by improving the aesthetic appearance of the product. For example, embossed patterns formed in tissue paper products after the tissue paper products have been dried are common. One embossed pattern which appears in cellulosic paper towel products marketed by the Procter and Gamble Company is illustrated in U.S. Patent Des. 239,137 issued Mar. 9, 1976 to Appleman. Embossing is also illustrated in U.S. Pat. No. 3,556,907 issued Jan. 19, 1971 to Nystrand; U.S. Pat. No. 3,867,225 issued Feb. 18, 1975 to Nystrand; and U.S. Pat. No. 3,414,459 issued Dec. 3, 1968 to Wells.

However, embossing processes typically impart a particular aesthetic appearance to the paper structure at the expense of other properties of the structure. In particular, embossing a dried paper web disrupts bonds between fibers in the cellulosic structure. This disruption occurs because the bonds are formed and set upon drying of the embryonic fibrous slurry. After drying the paper structure, moving fibers normal to the plane of the paper structure by embossing breaks fiber to fiber bonds. Breaking bonds results in reduced tensile strength of the dried paper web. In addition, embossing is typically done after creping of the dried paper web from the drying drum. Embossing after creping can disrupt the creping pattern imparted to the web. For instance, embossing can eliminate the creping pattern in some portions of the web by compacting or stretching the creping pattern. Such a result is undesirable because the creping pattern improves the softness and flexibility of the dried web.

In addition, dry embossing a paper structure acts to stretch or draw the paper structure around the perimeter of the embossments. As a result, the paper structure around the perimeter of the embossments will have a reduced thickness relative to the non-embossed portion of the paper web.

Felts for use in papermaking are also well known. U.S. Pat. No. 3,537,954 issued to Justus discloses imparting a creping pattern to a web with a felt having yarns running in the cross machine direction along the outer surface of the felt. U.S. Pat. No 4,309,246 issued to Hulit et al. discloses pressing a web between a felt and an imprinting fabric. U.S. Pat. No. 4,144,124 issued to Turunen et al. discloses a paper machine having a twin-wire former having a pair of endless fabrics, which can be felts. One of the endless fabrics carries a paper web to a press section. The press section can include the endless fabric which carries the paper web to the press section, an additional endless fabric, and a wire for patterning the web. U.S. patent application Ser. No. 08/170,140, Method of Pressing and Molding a Paper Sheet, filed Dec. 20, 1993 in the name of Ampulski et al. discloses a process for molding and dewatering a paper web which employs dewatering felts. U.S. Pat. No. 4,446,187 to Eklund discloses a sheet assembly which can be used as a forming fabric, press fabric, and drying fabric porous belt, including as a press felt and a drying felt. The sheet assembly includes a foil and a reinforcement structure bonded together. The foil can be formed from a plastic material, and is formed with through-holes. Eklund teaches that it is desirable to produce a belt fabric which possesses as even a surface as possible to provide an even pressure distribution and to avoid a coarse surface structure in the finished paper. Eklund teaches that by adapting the diameter and positions of the holes in the foil, it is possible to obtain a dewatering belt possessing a very even pressure distribution.

U.S. Pat. No. 4,740,409 to Lefkowitz discloses a nonwoven fabric having parallel machine direction yarns and interconnecting cross machine direction polymeric material surrounding the machine direction yarns. The cross machine direction polymeric material contains spaced perforations through the fabric.

PCT Publication Number WO 92/17643 published Oct. 15, 1992 in the name of Buchanan et al. and assigned to the SCAPA Group discloses a base fabric for use in producing a papermakers fabric. The base fabric includes superimposed layers of thermoplastic materials in mesh form. Buchanan teaches that the base fabric can be embodied in a marking felt.

PCT Publication Number WO 91/14558 published Oct. 3, 1991 in the name of Sayers et al. and assigned to the SCAPA Group discloses a method of making an apertured polymeric resin material use in papermaking by curing a radiation curable polymeric material. Sayers et al. teaches that the apertured structure may be combined with a textile batt to form a papermakers dewatering felt. U.S. Pat. No. 4,514,345 issued Apr. 30, 1985 to Johnson et al. teaches a method of making a foraminous member with a photosensitive resin.

U.S. Pat. No. 5,328,565, Tissue Paper Having Large Scale, Aesthetically Discernible Patterns and Apparatus for Making Same, issued Jul. 12, 1994 in the name of Rasch et al. discloses a single lamina paper structure having at least three visually discernible regions. Rasch et al. teaches the three regions are visually distinguishable by an optically intensive property such as crepe frequency, elevation, or opacity. Rasch et al. teaches that opacity can be increased by increasing the density of a region. Rasch et al. also teaches that differences in elevation between adjacent regions can be imparted to a paper structure by differences in elevation of the distal ends of adjacent flow elements. While the structures of Rasch et al. provide an improvement over embossed paper structures, there is a need to provide tissue products having improved visually discernible patterns over those taught in Rasch et al. Therefore, those involved in the papermaking field continue to search for ways to make paper structures having highly discernible aesthetic patterns without sacrificing desirable paper web properties.

Accordingly, one object of the present invention is to provide a web patterning apparatus suitable for making paper having visually discernible patterns.

Another object is to provide a web patterning apparatus having a dewatering felt layer and a photosensitive resin web patterning layer.

Another object is to provide a method for making such a web patterning apparatus.

SUMMARY OF THE INVENTION

The invention comprises an apparatus for use in making a web of papermaking fibers. The apparatus comprising: a dewatering felt layer having a first web facing felt surface at a first elevation and a second oppositely facing felt surface, and a web patterning layer comprising a photosensitive resin. The patterning layer penetrates the first felt surface, and extends from the first felt surface to form a web contacting top surface at a second elevation different from the first elevation of the first felt surface.

The invention also comprises an method of forming a web support apparatus having a felt layer and a web patterning layer. The method comprising the steps of providing a dewatering felt having a first surface and a second oppositely facing surface; providing a liquid photosensitive resin; providing a source of actinic radiation, applying a liquid photosensitive resin to the first surface of the dewatering felt; exposing at least some of the liquid photosensitive resin on the first surface of the dewatering felt to the actinic radiation, and curing at least some of the photosensitive resin to provide a resin layer having a predetermined pattern and extending from the first surface of the dewatering felt.

DESCRIPTION OF THE DRAWINGS

While the Specification concludes with claims particularly pointing out and distinctly claiming the present invention, the invention will be better understood from the following description taken in conjunction with the associated drawings, in which like elements are designated by the same reference numeral, and:

DETAILED DESCRIPTION OF THE INVENTION

Figure 9:
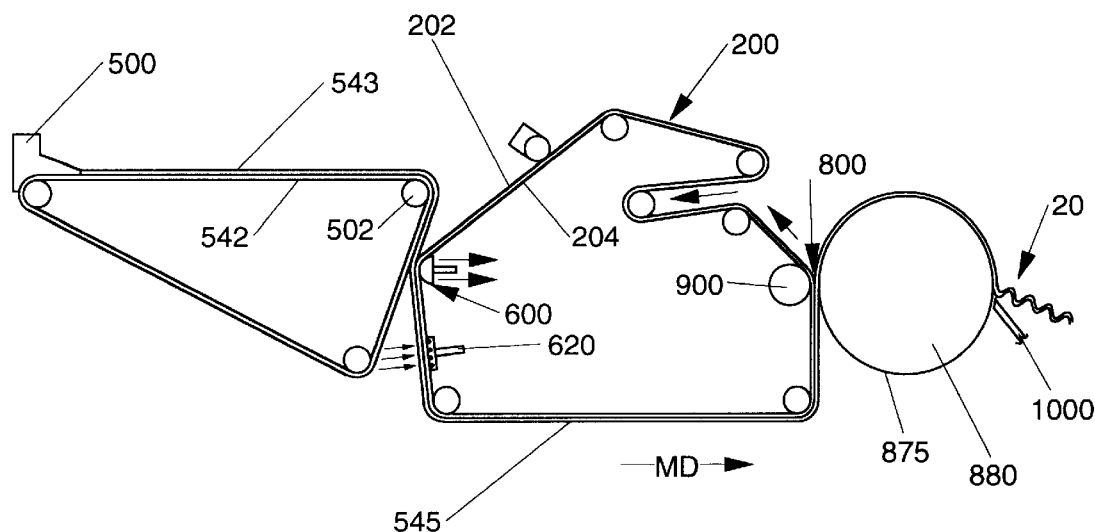
FIG. 9 is an illustration of a process for making a paper structure according to the present invention.
Figure 10:
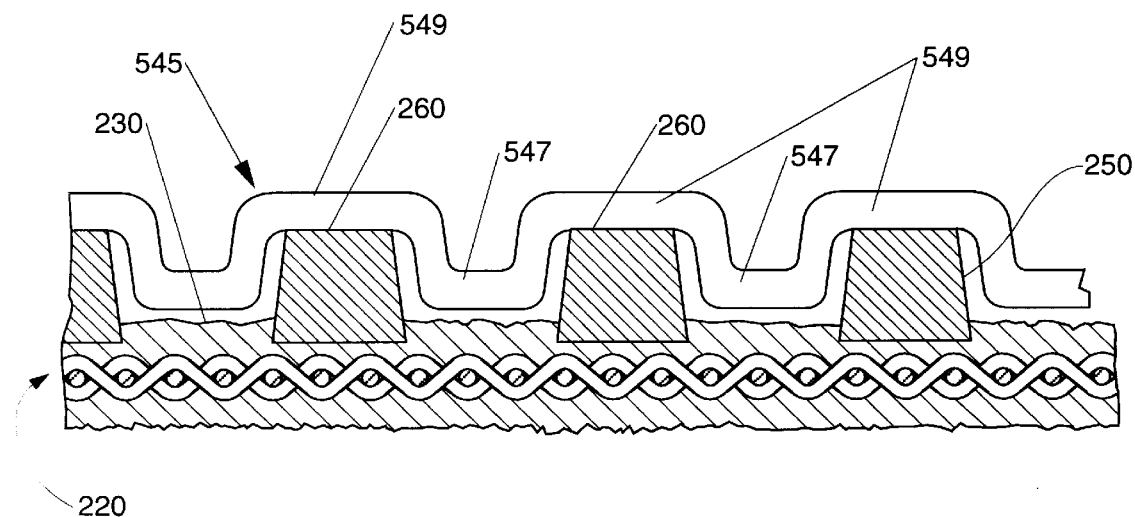
FIG. 10 is an illustration of a non-monoplanar, generally uncompacted paper web deflected while supported on a web support apparatus comprising a felt layer and a web patterning layer to provide a first generally uncompacted web region at a first elevation and a second generally uncompacted web region at a second elevation different from the first elevation.
Figure 11:
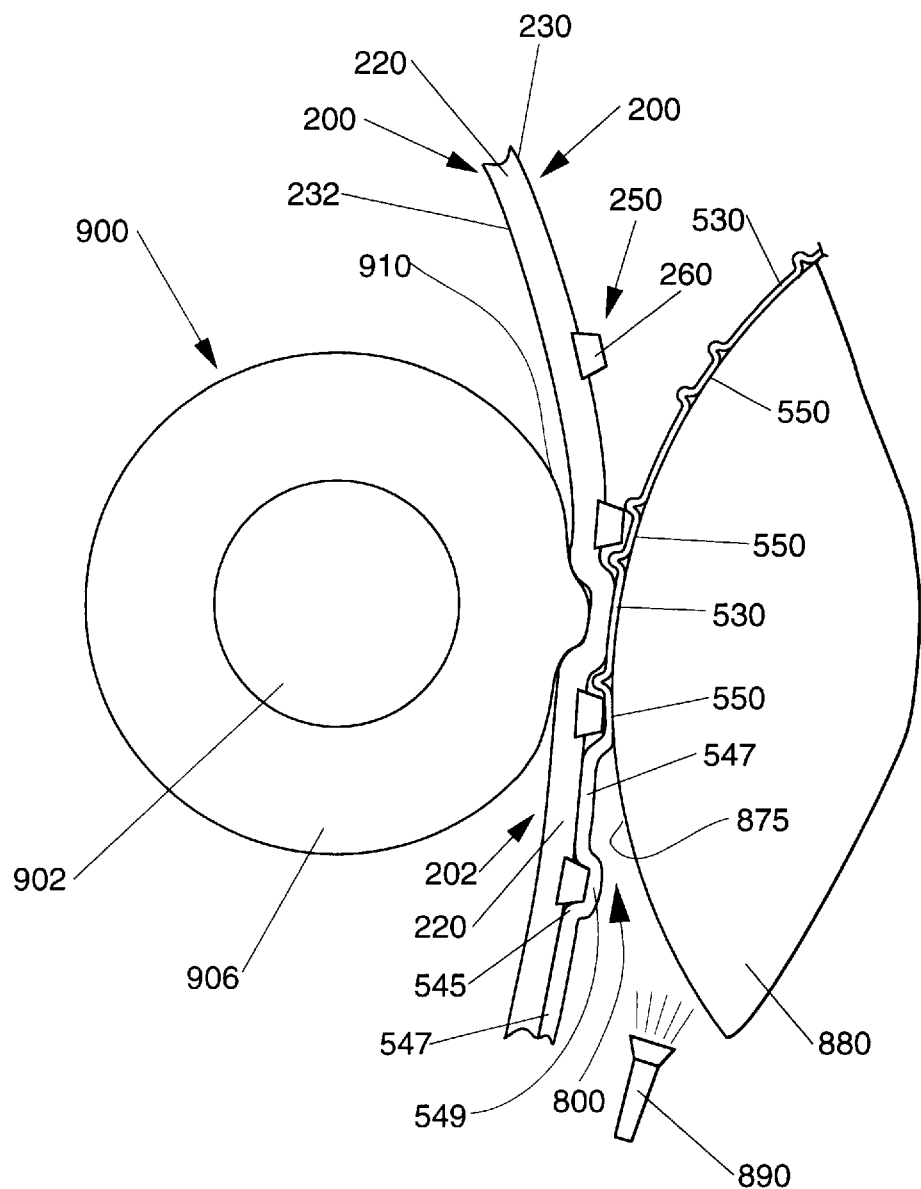
FIG. 11 is an illustration of a paper web being compacted against the surface of a drying drum by deflecting the first felt surface of the web support apparatus relative to the web contacting surface of the web patterning layer.
Figure 12:
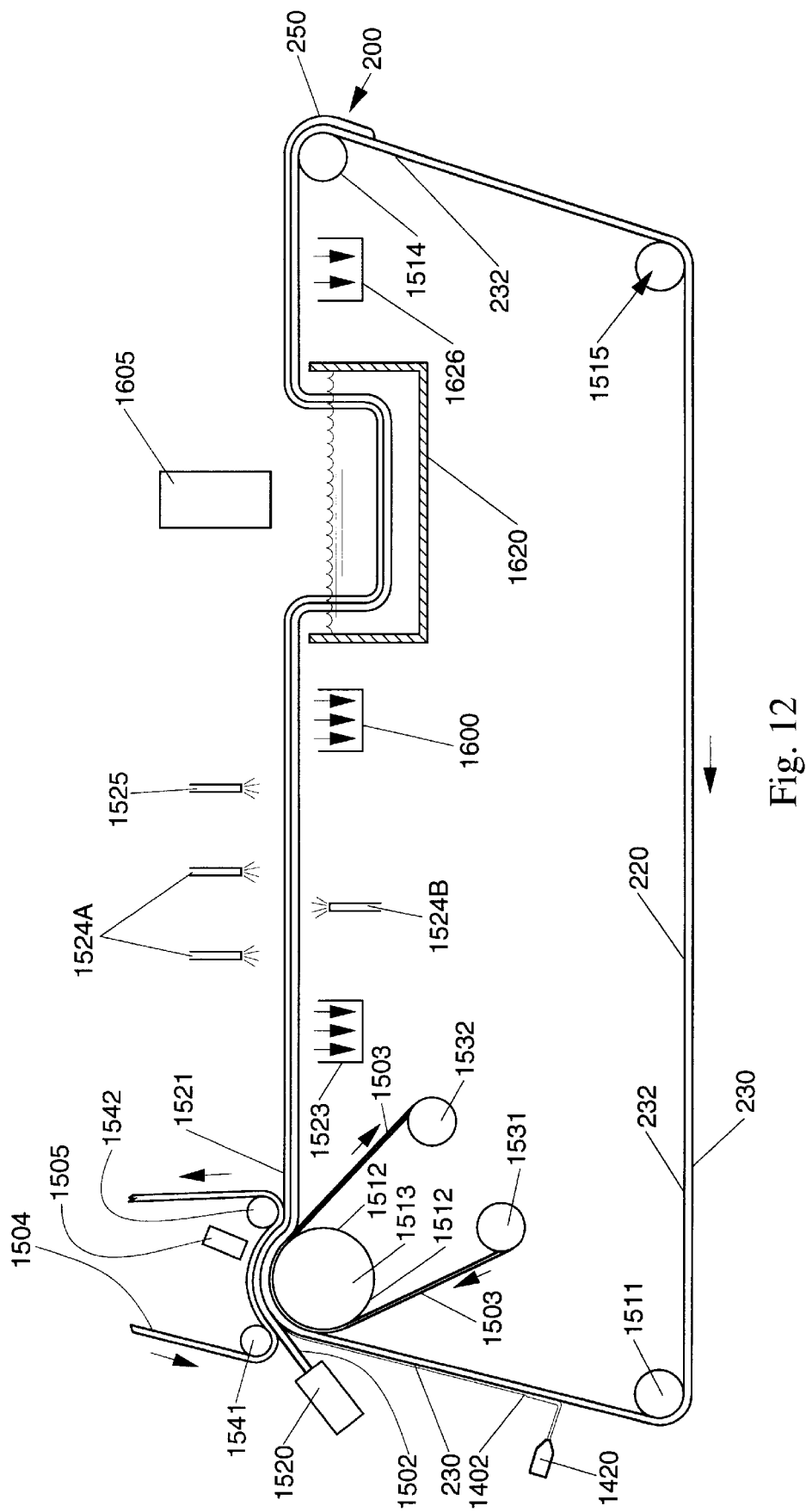
FIG. 12 is an illustration of a machine for making a web support apparatus having a felt dewatering layer and a web patterning layer formed from photosensitive resin.

FIGS. 1–4 and 13 illustrate embodiments of a web support apparatus 200 comprising a dewatering felt layer 220 and a web patterning layer 250. FIGS. 5–8 and 14 illustrate a paper structure 20 according to the present invention, the paper structure having a transition region interconnecting first and second regions disposed at different elevations, wherein the transition region thickness is greater than the thickness of the second region, and greater than or equal to the thickness of the first region. FIGS. 9–11 illustrate a method employing an apparatus 200 such as that shown in FIG. 4 for making a paper structure 20. FIG. 12 is a schematic illustration of a method for making a web support apparatus 200 having a web patterning layer 250 formed of photosensitive resin cured on a dewatering felt layer 220.

Web Support Apparatus

FIGS. 1, 2, 3, and 4 show different embodiments of a web support apparatus 200, which can comprise a continuous drying belt (FIG. 9) for drying and imparting a pattern to a paper web. The web support apparatus 200 has a first web facing side 202 and a second oppositely facing side 204. The web support apparatus 200 is viewed with the first web facing side 202 toward the viewer in FIGS. 1, 3, and 4.

Figure 2:
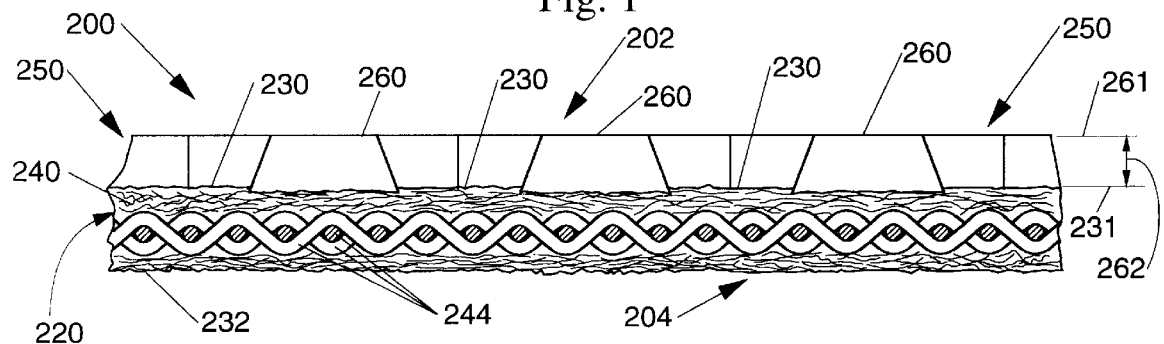
FIG. 2 is a cross-sectional view of the apparatus of FIG. 1 showing the dewatering felt layer to have a first web facing felt surface at a first elevation and an oppositely facing second felt surface, and showing the web patterning layer penetrating the first felt surface to extend through less than the fill thickness of the dewatering felt layer, the web patterning layer extending from the first felt surface to form the web contacting top surface at a second elevation different from the first elevation.

The web support apparatus 200 comprises a dewatering felt layer 220 having a first web facing felt surface 230 disposed at a first elevation 231, and an oppositely facing second felt surface 232. The web support apparatus 200 also comprises a web patterning layer 250 joined to the first web facing surface 230. The web patterning layer 250 extends from the first felt surface 230, as shown in FIG. 2, to have a web contacting top surface 260 at a second elevation 261 different from the first elevation 231. The difference 262 between the first elevation 231 and the second elevation 261 is at least about 0.05 millimeter, and is preferably between about 0.1 and about 2.0 millimeters.

Figure 1:
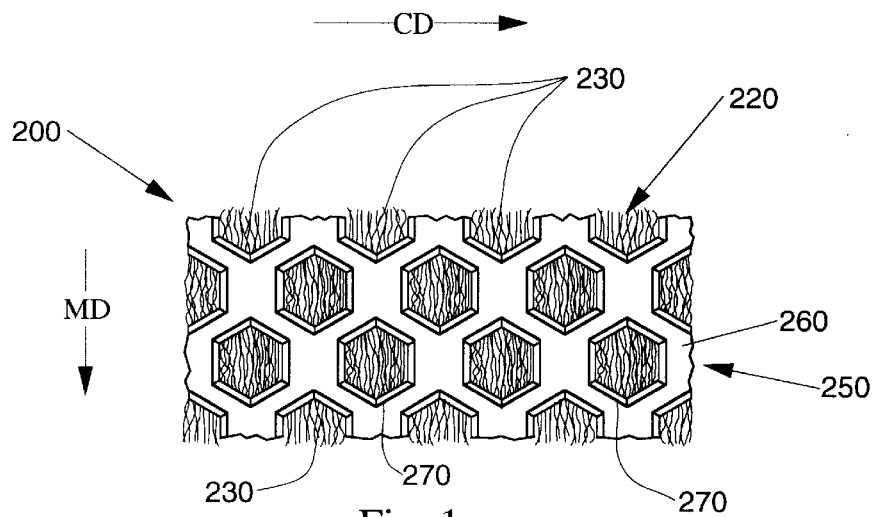
FIG. 1 is a plan view illustration of an apparatus for use in papermaking, the apparatus comprising a dewatering felt layer and a web patterning layer joined to the dewatering felt layer and having a continuous network web contacting top surface.
Figure 3:
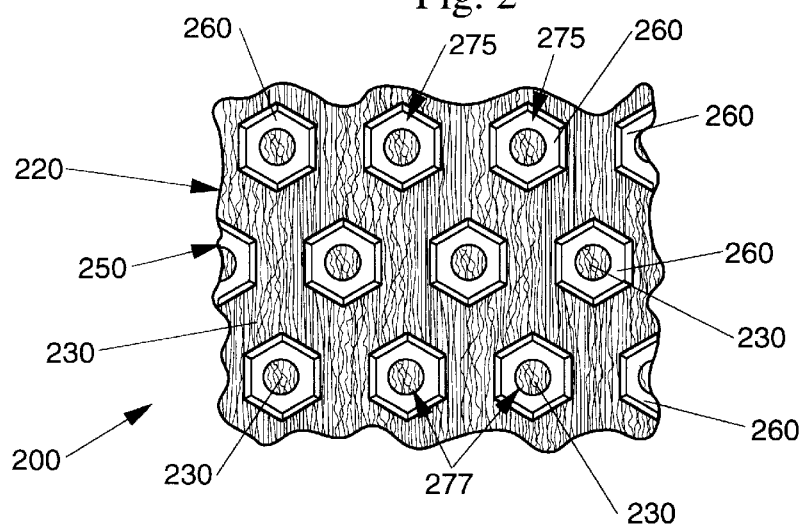
FIG. 3 is a plan view illustration of an alternative embodiment of an apparatus for use in papermaking, the apparatus comprising a dewatering felt layer having a first web facing felt surface, and a web patterning layer penetrating the first felt surface, the web patterning layer extending from the first felt surface and having a discontinuous web contacting top surface.
Figure 4:
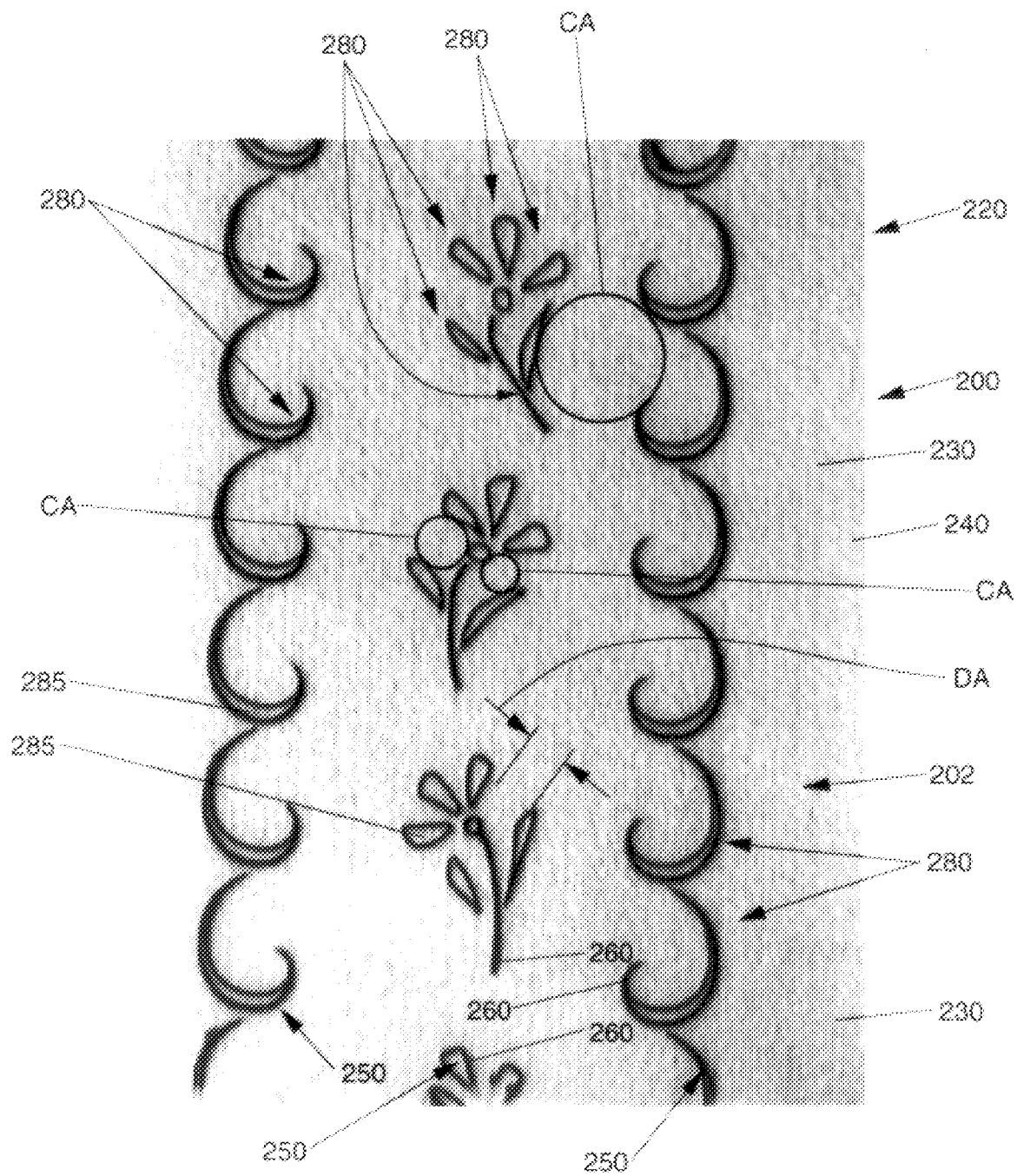
FIG. 4 is a photographic plan view of an embodiment of an apparatus for use in papermaking comprising a dewatering felt layer having a first web facing felt surface and a web patterning layer penetrating the first felt surface, the web patterning layer comprising a plurality of discrete web patterning elements.

The dewatering felt layer 220 is water permeable and is capable of receiving and containing water pressed from a wet web of papermaking fibers. The web patterning layer 250 is water impervious, and does not receive or contain water pressed from a web of papermaking fibers. The web patterning layer 250 can be continuous, as shown in FIG. 1, or discontinuous, as shown in FIGS. 3 and 4.

The web patterning layer 250 preferably comprises a photosensitive resin which can be deposited on the first surface 230 as a liquid and subsequently cured by radiation so that a portion of the web patterning layer 250 penetrates, and is thereby securely bonded to, the first felt surface 230. The web patterning layer 250 preferably does not extend through the entire thickness of the felt layer 220, but instead extends through less than about half the thickness of the felt layer 220 to maintain the flexibility and compressibility of the web support apparatus 200, and particularly the flexibility and compressibility of the felt layer 220. The curing depth can be controlled by a number of different methods, alone or in combination, such as by varying the intensity and duration of the actinic radiation, varying the thickness of the felt layer 220. The photosensitive resin under the first felt surface 230 can then be cured so that the web patterning layer 250 penetrates the first felt surface but does not extend through the full thickness of the felt layer. The web patterning layer 250 is thereby securely bonded to the felt layer 220 while maintaining flexibility of the felt layer 220 and the web support apparatus 200.

A suitable dewatering felt layer 220 comprises a non-woven batt 240 of natural or synthetic fibers joined, such as by needling, to a support structure formed of woven filaments 244. Suitable materials from which the nonwoven batt can be formed include but are not limited to natural fibers such as wool and synthetic fibers such as polyester and nylon. The fibers from which the batt 240 is formed can have a denier of between about 3 and about 20 grams per 9000 meters of filament length.

The felt layer 220 can have a layered construction, and can comprise a mixture of fiber types and sizes. The felt layer 220 is formed to promote transport of water received from the web away from the first felt surface 230 and toward the second felt surface 232. The felt layer 220 can have finer, relatively densely packed fibers disposed adjacent the first felt surface 230. The felt layer 220 preferably has a relatively high density and relatively small pore size adjacent the first felt surface 230 as compared to the density and pore size of the felt layer 220 adjacent the second felt surface 232, such that water entering the first surface 230 is carried away from the first surface 230.

The dewatering felt layer 220 can have a thickness greater than about 2 mm. In one embodiment the dewatering felt layer 220 can have a thickness of between about 2 mm and about 5 mm. The dewatering felt layer 220 can have a compressibility of at least about 30 percent, and in one embodiment the felt layer 220 can have a compressibility of at least about 40 percent. The thickness and the compressibility of the dewatering felt layer 220 are measured using the following procedure.

The thickness and compressibility are measured with a constant rate of compression tester, such as an Instron Model 4502, available from Instron Engineering of Canton, Mass. The measurements are made between a smooth steel base plate (5.5 inches in diameter, Instron part number T504173) and a circular compression foot (0.987 inches in diameter) centered over the base plate and attached to a gimbaled mounting on a crosshead. The crosshead speed is about 0.5 inch per minute.

Prior to measuring the thickness and compressibility, the instrument is calibrated in the following manner to determine a correction factor as a function of loading pressure. The circular compression foot is moved toward the smooth base until the foot and the base just touch, and no light passes between them. This is considered the zero-load, zero-thickness point. The cross head is then moved back 0.500 inch to allow for insertion of the sample. (A gap larger than 0.500 inches can be used for thicker samples, provided the larger gap is precisely measured and used in place of 0.500 inches in determining the correction factors.) The instrument is then reset to zero displacement. A calibration compression is then done (without the sample in the instrument) at pressures between 0 and 1000 psi to provide a calibration crosshead displacement at the different pressures. When measuring the sample thickness at any pressure, the correction factor for that pressure is the calibration crosshead displacement at that pressure minus 0.500 inch.

The sample is tested by placing it between the base plate and the compression crosshead and recording load versus crosshead displacement over a range of 0–1000 psi. The load is calculated as the force read from the instrument divided by the area of the compression foot. Thickness readings of the sample at 1 psi and 1000 psi are calculated by reading the crosshead displacment and applying the corresponding correction factor to obtain the corrected thicknesses at 1 psi and 1000 psi. The thickness of the felt layer 220 is the average of five corrected thickness measurements made at 1 psi. The compressibility of the felt layer 220 is 100 times the ratio obtained by dividing the corrected thickness of the felt layer at 1000 psi by the corrected thickness of the felt layer at 1 psi. The ratio is determined from an average of five measurements at 1 psi and five measurements at 1000 psi.

The dewatering felt layer 220 can have an air permeability of less than about 400 standard cubic feet per minute (scfm), where the air permeability in scfm is a measure of the number of cubic feet of air per minute that pass through a one square foot area of a felt layer, at a pressure differential across the dewatering felt thickness of about 0.5 inch of water. The air permeability is measured using a Valmet permeability measuring device (Model Wigo Taifun Type 1000) available from the Valmet Corp. of Pansio, Finland. In one embodiment, the dewatering felt layer 220 can have an air permeability of between about 5 and about 200 scfm.

The dewatering felt layer 220 can have a water holding capacity of at least about 100 milligrams of water per square centimeter of surface area. The water holding capacity is a measure of the amount of water that can be contained in a one square centimeter section of the dewatering felt, as described below. In one embodiment, the dewatering felt layer 220 have a water holding capacity of at least about 150 mg/square cm.

The dewatering felt layer 220 can have a small pore capacity of at least about 10 mg/square cm. The small pore capacity is a measure of the amount of water that can be contained in relatively small capillary openings in a one square centimeter section of a dewatering felt, as described below. By relatively small capillary openings, it is meant capillary openings having an effective radius of about 75 micrometers or less. Such capillary openings are similar in size to those in a wet paper web. Accordingly, the small pore capacity provides an indication of the ability of the dewatering felt to compete for water from a wet paper web. In one embodiment, the dewatering felts 320 and 350 can have a small pore capacity of at least about 25 mg/square cm.

The water holding capacity and the small pore capacity of a dewatering felt are measured using a liquid porosimeter, such as a TRI Autoporosimeter available from TRI/Princeton Inc. of Princeton, N.J. The measurements of water holding capacity and small pore capacity are made according to a methodology which is generally described by B. Miller and I. Tyomkin in the article "Liquid Porosimetry: New Methodology and Applications," at pages 163–170, Journal of Colloid and Interface Science 162,(1994), which article is incorporated herein by reference to the extent it is not inconsistent with the description below.

The water holding capacity and the small pore capacity measurements are made by increasing the pressure differential across the sample in increments, and measuring the amount of water expelled from the sample at each increment of pressure differential. A liquid porosimeter measures the amount of water driven from the sample at different pressure differentials, which provides a measure of the amount of water held in pores within a certain range of effective radius. The effective radius of a pore is related to the pressure differential at which water is expelled from the pore by the following relationship:

Pressure differential=(2)(surface tension)(cos (contact angle) )/effective radius The water holding capacity and small pore capacity measurements are made over a pore size range of 5–500 micrometers effective radius, with step changes of pressure differential corrosponding to a change of pore effective radius in the range of about 5–25 microns. The amount of water expelled at each incremental step change in pressure differential is weighed with a balance.

The Autoporosimeter is triggered to move to the next pore size (next step change in pressure differential) when the flow rate of fluid to the balance is less than 2 mg/minute. A 5.5 cm square test sample of the dewatering felt is presaturated with an aqueous solution having a surface tension of 31 dynes/cm. An aqueous surface tension of 31 dynes/cm is achieved by adding 0.2 percent by weight of Triton X-100 surfactant to deionized water. Triton X-100 is a nonionic surfactant available from the Union Carbide Chemical and Plastics Co. of Danbury Conn., and described generically as octylphenoxy polyethoxy ethanol.

The Autoporosimeter is run in an extrusion (desorption) mode. The measurements are made using the following values: cosign of contact angle set to 1.0, liquid density setl to 1.0, equilibrium set at 2. The sample is confined by a flat plate providing a constraining pressure of 0.25 psi. A membrane having an average pore size of 0.22 micrometers is positioned immediately beneath the sample being measured. A suitable membrane is available from the Millipore Corporation of Bedford, Mass. under the catalogue designation GSWP09025.

The water holding capacity of the dewatering felt is the total weight of the fluid held in pores having an effective radius of 500 micrometers or less (as measured with the porosimeter), divided by the surface area of the sample. The small pore capacity of the dewatering felt is the total weight of the fluid held in pores having an effective radius of 75 micrometers or less (as measured with the porosimeter), divided by the surface area of the sample.

The dewatering felt layer 220 can have a basis weight of between about 800 and about 2000 grams per square meter, an average density (basis weight divided by thickness) of between about 0.35 gram per cubic centimeter and about 0.45 gram per cubic centimeter, The air permeability of the web support apparatus 200 is less than or equal to the permeability of the felt layer 220.

A suitable felt layer 220 is an Amflex 2 Press Felt manufactured by the Appleton Mills Company of Appleton, Wisc. Such a felt layer 220 can have a thickness of about 3 millimeter, a basis weight of about 1400 gm/square meter, an air permeability of about 30 scfm, and have a double layer support structure having a 3 ply multifilament top and bottom warp and a 4 ply cabled monofilament cross-machine direction weave. The batt 240 can comprise polyester fibers having a denier of about 3 at the first surface 230, and denier of between about 10–15 in the batt substrate underlying the first surface 230.

The web patterning layer 250 is preferably made by applying a layer of liquid photosensitive resin to the first felt surface 230, exposing at least some of the liquid photosensitive resin to a source of actinic radiation, curing some of the resin to provide a solid resin web patterning layer 250 having a predetermined pattern, and removing the uncured resin from the dewatering felt layer 220. Photosensitive resins are materials, such as polymers, which cure or crosslink under the influence of actinic radiation, usually ultraviolet (UV) light. Suitable resins are disclosed in U.S. Pat. No. 4,514,345 issued Apr. 30 1985 to Johnson et al. which patent is incorporated herein by reference.

The resin, when cured, should have a hardness of no more than about 60 Shore D. The hardness is measured on an unpatterned photopolymer resin coupon measuring about 1 inch by 2 inches by 0.025 inches thick cured under the same conditions as the web patterning layer 250. The hardness measurement is made at 85 degrees Centigrade and read 10 seconds after initial engagement of the Shore D durometer probe with the resin. A resin having such a hardness upon curing is desirable so that the web patterning layer 250 is somewhat flexible and deformable. Flexibility and deformability of the web patterning layer 250 can be desirable for making the paper structure 20 described below.

The resin preferably resists oxidation, and can have viscosity of between about 5000 and about 15000 centipoise at 70 degrees Fahrenheit to facilitate penetration of felt layer 220 by the resin prior to curing. Suitable liquid photosensitive resins are included in the Merigraph series of resins made by Hercules Incorporated of Wilmington, Del. incorporating an antioxidant to improve the life of the web patterning layer 250.

The web support apparatus 200 can be made using the process schematically illustrated in FIG. 12. In FIG. 12, a forming unit 1513 in the form of a drum is provided having a working surface 1512. The forming unit 1513 is rotated by a drive means not illustrated. A backing film 1503 is provided from a roll 1531, and taken up by a roll 1532. Intermediate the rolls 1531 and 1532, the backing film 1503 is applied to the working surface 1512 of the forming unit 1513. The function of the backing film is to protect the working surface of the forming unit 1513 and to facilitate the removal of the partially completed web support apparatus 200 from the forming unit 1513. The backing film 1503 can be made of any suitable material including , but not limited to, polypropylene and have a thickness of between about 0.01 and about 0.1 millimeter.

The felt dewatering layer 220, which is shown in the form of a continuous belt in FIG. 12, is conveyed across a precoating nozzle 1420 positioned against the first felt surface 230. The nozzle 1420 extrudes a film 1402 of the liquid photosensitive resin onto the first felt surface 230 to uniformly cover the first felt surface. The extruded film 1402 wets the surface 230 and helps prevent the formation of air bubbles on the first felt surface 230 when additional resin is subsequently applied to the first felt surface 230.

The felt dewatering layer 220 is then positioned adjacent the backing film 1503 such that backing film 1503 is interposed between the felt dewatering layer 220 and the forming unit 1513, and such that the second felt surface 232 of the felt dewatering layer 220 is positioned adjacent the backing film 1503. As shown in FIG. 12, the felt dewatering layer 220 in the form of a continuous belt is conveyed about return roll 1511, about forming unit 1513, and around return rolls 1514 and 1515.

A coating of liquid photosensitive resin 1502 is applied over the film 1402. The coating of liquid photosensitive resin 1502 can be applied to the first felt surface in any suitable manner. In FIG. 12 the coating of resin 1502 is applied by a nozzle 1520. The thickness of the coating of resin 1502 is controlled to a preselected value corresponding to the desired difference in elevation 262 between the elevation 231 of the first felt surface 230 and the elevation 261 of the web contacting top surface 260 of the web patterning layer 250. In FIG. 12, the thickness of the coating of resin 1502 is controlled by mechanically controlling the clearance between a nip roll 1541 and the forming unit 1513. The nip roll 1541 in conjunction with a mask 1504 and a mask guide roll 1542 tend to smooth the surface of the resin 1502 and control its thickness, and distribute the liquid resin through the entire thickness of the felt layer 220.

The mask 1504 can be formed of any suitable material which can be provided with opaque and transparent portions. The transparent portions are arranged in a pattern corresponding to the desired pattern of the web patterning layer 250. A material in the nature of a flexible photographic film is suitable. The opaque portions can be applied to the mask 1504 in any suitable way, such as photographic, gravure, flexographic, or rotary screen printing. The mask 1504 can be an endless belt, or alternatively, supplied from one supply roll and taken up by a take-up roll. As shown in FIG. 12, the mask 1504 is conveyed around the rolls 1541 and 1542, and intermediate the rolls 1541 and 1542 is brought into contact with the surface of the resin 1502.

The photosensitive resin 1502 is exposed to actinic radiation of an activating wavelength through the mask 1504, thereby inducing partial curing of the resin 1502 in those portions of the layer of resin 1502 which are in register with transparent portions of the mask 1504 to form a partially cured resin layer 1521. In FIG. 12, radiation having an activating wavelength is supplied by a first exposure lamp 1505. The activating wavelength is a characteristic of the resin 1502, and can be supplied by any suitable source of illumination such as mercury arc, pulsed xenon, electrodless, and fluorescent lamps. Partial curing of the resin is manifested by a solidification of the resin registered with the transparent portions of the mask 1504, while the unexposed portions of the resin 1502 registered with the opaque portions of the mask 1504 remain liquid.

A subsequent step in forming the apparatus 200 comprises removing substantially all the uncured liquid resin from the felt dewatering layer 220. The uncured liquid resin can be removed from the felt layer 220 by washing the felt layer 220 in a mixture of surfactant and water. At a point adjacent the roll 1542 the mask 1504 and the backing film 1503 are separated from the felt layer 220 and the partially cured resin layer 1521. The composite felt layer 220 and partially cured resin layer 1521 travel to a first resin removal vacuum shoe 1523, where a vacuum is applied to the second felt surface 232 to remove uncured resin. The composite felt layer 220 and partially cured resin layer 1521 then travel past top wash showers 1524A and bottom wash showers 1524B. The showers 1524A, B deliver a washing mixture of water and a surfactant in a concentration of between about 0.01 and about 0.1 percent by volume surfactant. A suitable surfactant is a TOP JOB® brand detergent manufactured by The Procter and Gamble Company of Cincinnati, Ohio. The showers 1524A, B deliver the washing mixture at a temperature of about 160 degrees using fan jet nozzles such as Spray Systems nozzles number SS2506 having an orifice diameter of about 0.062 inches. The shower delivery pressure is about 140 psi at the top showers 1524A, and about 100 psi at the bottom showers 1524B. The showers 1524A, B and the felt layer 220 can be moved laterally relative to one another to eliminate streaking and provide uniform removal of the liquid resin across the width of the felt layer 220.

The composite felt layer 220 and resin layer 1521 then travel over a vacuum shoe 1600 where a vacuum is applied to the second felt surface 232 to remove uncured liquid resin and the washing mixture. The composite felt layer 220 and resin layer 1521 are then carried through a bath 1620 of water. A post cure lamp 1605 positioned over the bath 1600 is turned off while the composite felt layer 220 and resin layer 1521 are carried through the bath 1600. After leaving the bath 1600, a vacuum is applied to the second felt surface 232 by a vacuum shoe 1626 to remove uncured liquid resin and the water from the felt layer 220.

The washing sequence of carrying the felt layer 220 past the vacuum shoe 1523, washing the felt layer with the washing mixture at the showers 1524A, B; carrying the felt layer 220 past the vacuum shoe 1600; carrying the felt layer 220 through the bath 1600 comprising water; and carrying the felt layer 220 past the vacuum shoe 1626 is repeated at least about 4 to 6 times until substantially all the uncured liquid resin is removed from the felt layer 220. The washing sequence can be repeated by carrying the composite felt layer 220 and resin layer 1521 around the circuit provided by the rollers 1514, 1515, 1511, and 1513 four to six times. The first curing lamp 1505 and the post cure lamp 1605 are turned off during each repetition of the washing sequence.

Once the uncured liquid resin has been removed from the felt layer 220, the felt layer 220 is rinsed with water to remove wash mixture from the felt layer 220. After the residual wash mixture is removed from the felt layer, curing of the partially cured resin layer 1521 is completed with the post curing lamp 1605.

To remove the wash mixture from the felt layer 220, the composite felt layer 220 and resin layer 1521 are first carried past the vacuum shoe 1523 to remove wash mixture. The composite felt layer 220 and resin layer 1521 are then carried through the showers 1524A, B and a second rinse shower 1525 which rinse the felt layer 220 with water only in order to remove any excess wash mixture. To complete curing of the resin layer 1521, the composite felt layer 220 and resin layer 1521 are submerged in the bath 1620 which has been previously emptied and refilled to contain only water. The composite felt layer 220 and resin layer 1521 are carried through the bath 1620 with the post curing lamp 1605 turned on. The water in the bath 1620 permits passage of the actinic radiation from the post curing lamp 1605 to the resin layer 1521, while precluding oxygen which can quench the free radical polymerization reaction. Just prior to and during the post curing operation, the water sprayed from the showers 1524A, B and 1525 and the water in the bath 1620 should not include the surfactant because presence of the surfactant can restrict passage of the actinic radiation through the bath 1620 and to the resin layer 1521. After exiting the bath 1620, the composite felt layer 220 and resin layer 1521 are carried over the vacuum shoe 1526 to remove water from the felt layer 220.

The post curing sequence of passing the composite felt layer 220 and resin layer 1521 over the vacuum shoe 1523; through the showers 1524A, B and 1525; through the bath 600 with the post curing lamp 1605 turned on, and over the vacuum shoe 1626 can be repeated about 1 to 3 times until the resin layer 1521 is no longer tacky. At this point, the felt layer 220 and the cured resin, together, form the web support apparatus 200 having a web patterning layer 250 formed of the cured resin. The post curing sequence can be repeated by carrying the composite felt layer 220 and resin layer 1521 around the circuit provided by the rollers 1514, 1515, 1511, and 1513 one to three times with the lamp 1505 turned off.

In one embodiment, the mask 1504 can be provided with a transparent portion in the form a continuous network. Such a mask can be used to provide the web support apparatus 200 having a web patterning layer 250 having a continuous network web contacting top surface 260 having a plurality of discrete openings 270 therein as shown in FIG. 1. Each discrete opening 270 communicates with the first felt surface 230 through a conduit formed in the web patterning layer 250. Suitable shapes for the openings 270 include, but are not limited to circles, ovals elongated in the machine direction (MD in FIG. 1), polygons, irregular shapes. or mixtures of these The projected surface area of the continuous network top surface 260 can be between about 5 and about 75 percent of the projected area of the web support apparatus 200 as viewed in FIG. 1, and is preferably between about 20 percent and about 60 percent of the projected area of the web support apparatus 200 as viewed in FIG. 1.

In the embodiment shown in FIG. 1, the continuous network top surface 260 can have less than about 700 discrete openings 270 per square inch of the projected area of the web support apparatus 200, and preferably between about 70 and about 700 discrete openings 270 therein per square inch of projected area of the web support apparatus as viewed in FIG. 1. Each discrete opening 270 in the continuous network top surface can have an effective free span which is between about 0.5 and about 3.5 millimeter, where the effective free span is defined as the area of the opening 270 divided by one-fourth of the perimeter of the opening 270. The effective free span can be between about 0.6 and about 6.6 times the elevation difference 262. An apparatus having such a pattern of openings 270 can be used as a drying belt or press fabric on a papermaking machine for making a patterned paper structure having a continuous network region which can be a compacted, relatively high density region corresponding to the web contacting surface 260, and a plurality of generally uncompacted domes dispersed domes dispersed throughout the continuous network region, the domes corresponding to the positioning of the openings 270 in the surface 260. The discrete openings 270 are preferably bilaterally staggered in the machine direction (MD) and cross-machine direction (CD) as described in U.S. Pat. No. 4,637,859 issued Jan. 20, 1987, which patent is incorporated herein by reference. In the embodiment shown in FIG. 1, openings 270 are over-lapping and bilaterally staggered, with the openings sized and spaced such that in both the machine and cross-machine directions the edges of the openings 270 extend past one another, and such that any line drawn parallel to either the machine or cross-machine direction will pass through at least some openings 270.

In the embodiment shown in FIG. 3, the web patterning layer 250 has a discontinuous web contacting top surface 260. The web patterning layer 250 comprises a plurality of discrete projections 275. The projections 275 can have any suitable shape, including but not limited to circles, ovals, polygons, irregular shapes, and mixtures of these. The apparatus 200 can have between about 50 and about 500 projections 275 per square inch of projected area of the apparatus 200, with each projection 275 surrounded by the first felt surface 230. The surface area of the top surface 260 can be between about 20 and about 60 percent of the projected area of the apparatus 200 as viewed in FIG. 3, and each projection 275 can have a maximum width of between about 0.6 and about 3.0 millimeter, with the maximum spacing between adjacent projections 275 no greater than about 2.0 millimeter. An apparatus 200 having such an arrangement of projections 275 can be used as a drying belt or press fabric on a papermaking machine to make a patterned paper structure having discrete compacted regions corresponding to the discrete surfaces 260 of each projection 275. In such a structure, the discrete compacted regions, which can be relatively high density regions, are dispersed throughout a continuous relatively uncompacted network, which network can be a relatively low density network region. Optionally, each discrete projection 275 can include a conduit 277 extending through the projection 275, the conduit bounded by the first felt surface 230.

In another embodiment, the web contacting top surface 260 has a projected surface area of between about 5 and about 20 percent, and more preferably between about 5 and about 14 percent of the projected area of the web support apparatus 200. The web patterning layer 250 inscribes a plurality of circular portions of the first felt surface 230, each inscribed circular portion having a projected area of at least about 10, preferably about 20, and more preferably at least about 100 square millimeters.

A web support apparatus 200 having a web contacting top surface 260 with a projected area in the above range and inscribing relatively large portions of the first felt surface 230, as described above, can be used to make a paper structure 20 having a transition region interconnecting first and second regions disposed at different elevations, wherein the transition region thickness is greater than the thickness of the second region, and greater than or equal to the thickness of the first region.

In the embodiment shown in FIG. 4, the web patterning layer 250 comprises a plurality of discrete web patterning elements 280 joined to the felt layer 220. Each discrete web patterning element 280 extends from the first felt surface 230 to have a discrete web contacting top surface 260. The spacing (DA in FIG. 4) between at least some adjacent elements 280 can be at least about 8 millimeter, and preferably at least about 10 times the difference between the first elevation 231 of the first felt surface 230 and the second elevation 261 of the web contacting top surface 260. Elements 280 are considered to be adjacent if the shortest straight line which can be drawn between the two elements does not intersect a third element.

Referring to FIG. 4, at least some adjacent web patterning elements 280 preferably can inscribe a plurality of circular portions CA of the first felt surface 230 having a projected surface area of at least about 10, preferably about 20 and more preferably about 100 square millimeters. In the embodiment shown in FIG. 4, a plurality of the discrete web patterning elements 280 are surrounded by the first felt surface 230. A plurality of the web patterning elements 280 each enclose a discrete opening 285. Each discrete enclosed opening 285 communicates with a surface having an elevation different from the surface 260. Preferably, each enclosed opening 285 communicates with the first felt surface 230. Some of the discrete web patterning elements 280 shown in FIG. 4 comprise flower shaped patterning elements.

The belt apparatus 200 having a web patterning layer 250 with the above projected area and disposed to inscribe portions of the first felt surface 230 with the above area is relatively flexible compared to a belt made from the same underlying felt layer but having a larger percentage of its surface covered by a web patterning layer. Such flexibility is one factor which permits deflection of the first felt surface 230 relative to the web contacting top surface 260 of the web patterning layer 250 for formation of a paper structure 20 having foreshortened regions at different elevations, as described below.

Figure 13:
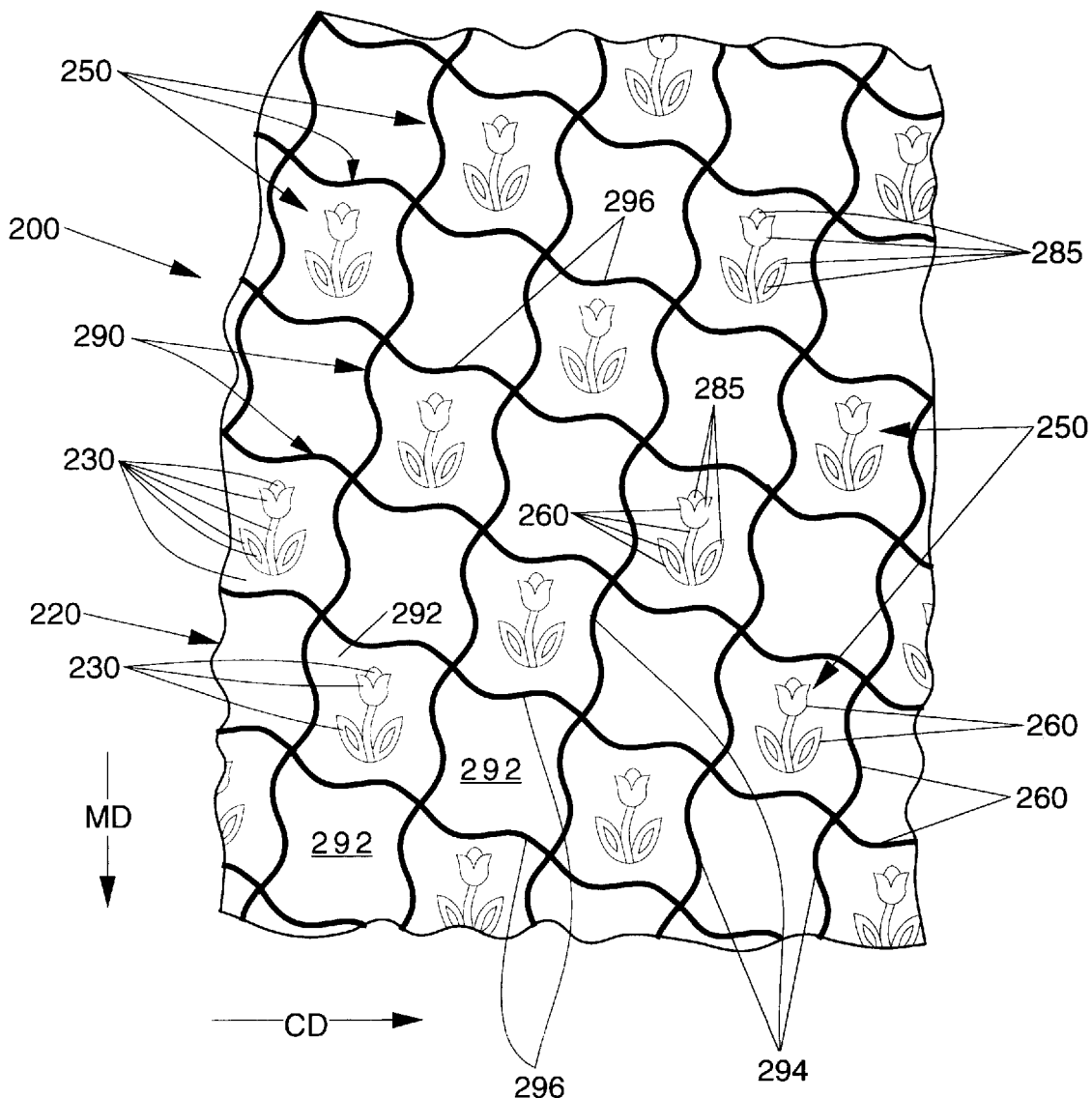
FIG. 13 is a plan view illustration of a web support apparatus wherein the web patterning layer comprises a lattice network and a plurality of discrete web patterning elements disposed within openings in the lattice network.

FIG. 13 show an alternative embodiments of a web support apparatus 200. FIG. 13 is a plan view illustration of a web support apparatus 200 wherein the web patterning layer 250 comprises a lattice network 290 and a plurality of discrete web patterning elements 280 disposed within at least some of a plurality of cells 292 formed by the lattice network 290. The lattice 290 in FIG. 13 comprises spaced apart bands 294 which intersect spaced apart bands 296 to form the cells 292. The bands 294 and/or the bands 296 can be unbroken, or alternatively, can be formed by a plurality of short, spaced apart segments. In FIG. 13 the bands 294 are unbroken and extend generally in the machine direction, and the bands 296 are unbroken and extend generally in the cross-machine direction. The web patterning layer 250 has a web contacting top surface 260 which comprises a continuous network web contacting top surface formed by the intersecting bands 294 and 296, and a discontinuous web contacting top surface formed by the discrete elements 280.

An alternative method for forming a web support apparatus 200 comprising a dewatering felt layer 220 and a web patterning layer 250 joined to a web facing surface of the dewatering felt layer is disclosed in U.S. Pat. No. 5,674,663 issued Oct. 7, 1997 in the name of McFarland et. al, which patent is incorporated herein by reference.

Paper Structure

A paper structure according to the present invention is taken off the web support apparatus 200 as a single ply having one or more fiber constituent layers. Though not necessary, two or more paper structures of the present invention can be joined together after drying to form a multi-ply paper product. A "zone" as used herein refers to a contiguous portion of the paper structure. A "region" of a paper structure, as used herein, refers to a portion or portions of the paper structure having a common property or characteristic, such as density, thickness, elevation, or creping pattern. A region can comprise one or more zones, and can be continuous or discontinuous.

Referring to FIGS. 5–8, the paper structure 20 according to the present invention comprises a tissue paper web having a first nonembossed region 30 disposed at a first elevation 32 and having a first thickness 31; a second nonembossed patterned region 50 disposed at a second elevation 52 different from the first elevation 32, and having a second thickness 51; and a third transition region 70 interconnecting the first and second nonembossed regions 30 and 50. The transition region 70 has a thickness 71. The thickness 71 is greater than the second thickness 51, and the thickness 71 is greater than or equal to the first thickness 31. In the embodiment shown in FIGS. 5 and 6A, B the thickness 71 is greater than each of the thicknesses 31 and 51. The thickness 71 is preferably at least 1.5 times greater than each of the thicknesses 31 and 51.

Figure 5:
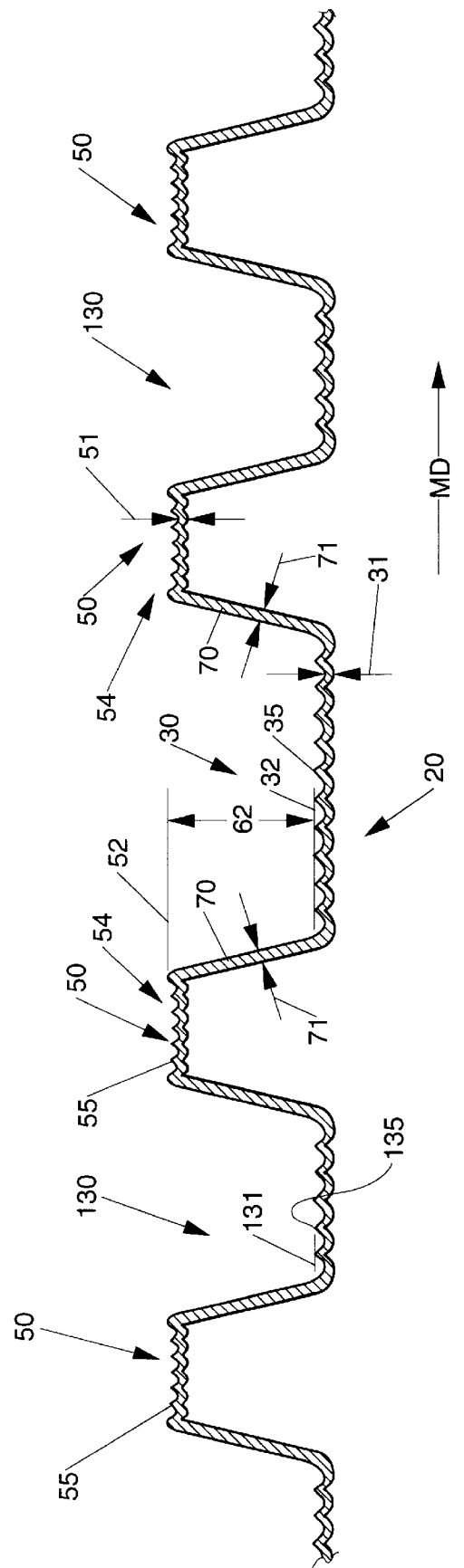
FIG. 5 is a cross-sectional illustration of a paper structure according to the present invention, the paper structure having a transition region interconnecting first and second regions disposed at different elevations, wherein the transition region thickness is greater than the thickness of the second region, and greater than or equal to the thickness of the first region.

The difference between the first and second elevations 32 and 52 is designated 62 in FIG. 5. The difference 62 is preferably at least about 0.05 millimeter. Such a difference in elevation is desirable to enhance the visual distinctness of the first and second regions 30 and 50. The thicknesses 31, 51, and 71 and the elevation difference 62 can be measured using the procedure described below with reference to FIGS. 6A and 6B.

The first and second regions 30 and 50 can be formed by selectively deflecting and compacting a wet web of paper-making fibers, as described below. For a web having a generally constant basis weight having thicknesses 31 and 51 less than the thickness 71, the first and second regions 30 and 50 can be characterized as relatively high density regions, while the transition region 70 can be a relatively low density region.

The first and second regions 30 and 50 are foreshortened. Foreshortening can be provided by creping a paper web with a doctor blade, as described below. Foreshortened portions of the paper structure 20 are characterized by having a creping pattern having a creping frequency. The creping pattern of the first region 30 is indicated by reference numeral 35, and is characterized by a series of peaks and valleys extending generally in the cross-machine direction. The machine and cross-machine direction are indicated as NID and CD, respectively, in the Figures. The creping pattern of the second region 50 is indicated by reference numeral 55 and is characterized by a series of peaks and valleys. The creping frequency of a creping pattern is defined as the number of times a peak occurs on the surface of the paper structure for a given linear distance measured in the machine direction.

The first and second regions 30 and 50 have foreshortened portions disposed at different elevations, such that at least a portion of the creping pattern 35 is disposed at an elevation different from the elevation at which the creping pattern 55 is disposed. At least a portion of the patterned second region 50 can be bordered by an uncreped zone, or a zone having a creping frequency different from that of the second region 50. In FIG. 5 the transition region 70 interconnecting the second region 50 with the first region 30 can be uncreped, or have a creping frequency different from that of the second region 50.

Figure 7:
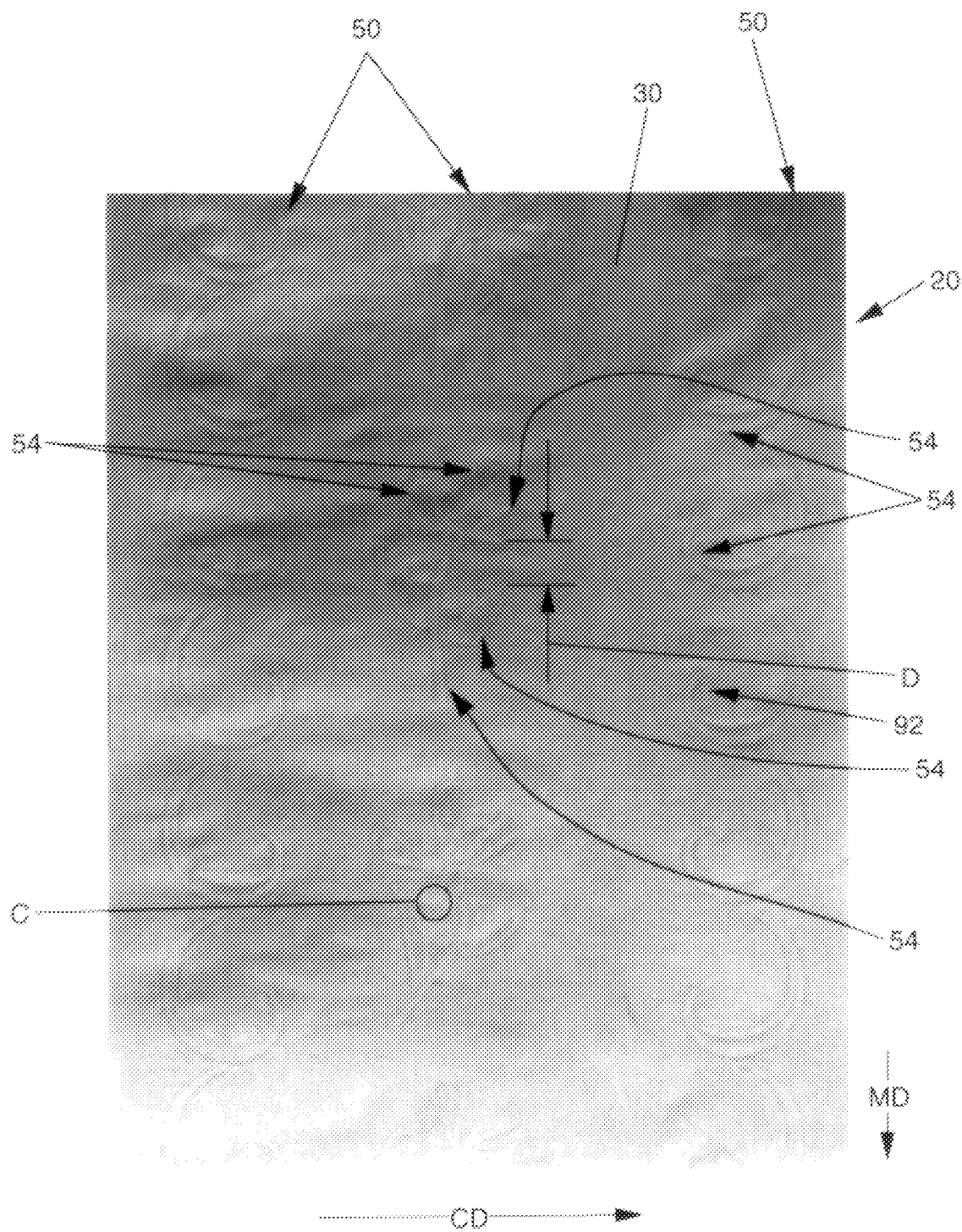
FIG. 7 is a photographic plan view of a paper structure according to the present invention.
Figure 8:
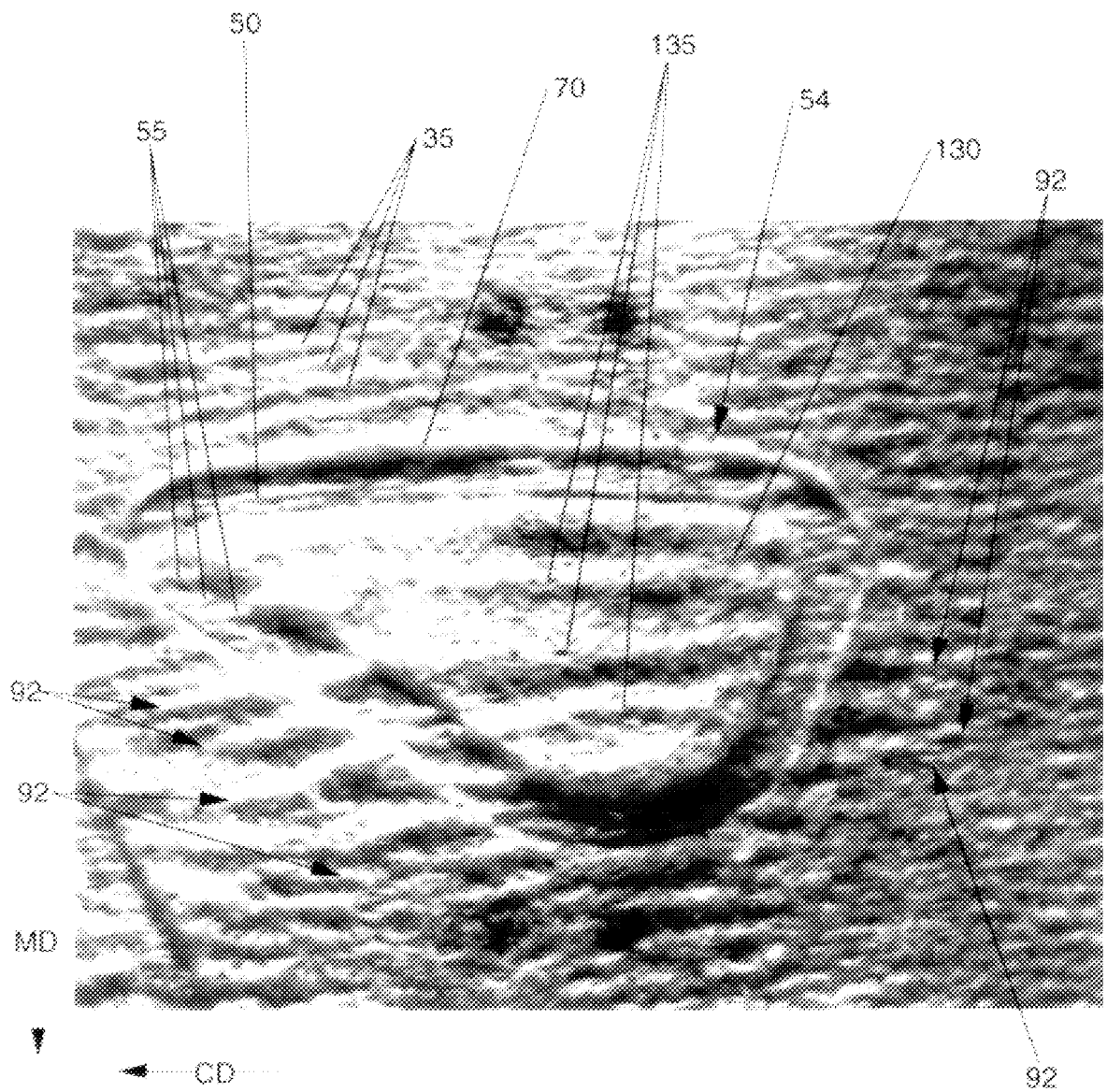
FIG. 8 is photographic plan view of a paper structure according to the present invention, enlarged relative to FIG. 7, and showing a variable creping frequency region.

Referring to FIGS. 7 and 8, at least a portion of the patterned second region 50 can be bordered by a variable frequency creping region. The variable frequency creping region has a reduced creping frequency relative to the creping frequency of at least one of the creping patterns 35 and 55. The variable frequency creping region is visible in FIGS. 7 and 8 as wrinkles 92 extending in the cross-machine direction. The wrinkles 92 of the variable frequency creping region extend from a portion of the border of the second region 50, and terminate in the first region 30. The creping patterns 35 and 55 can have frequencies of at least about 1.5 times that of the frequency of the wrinkles 92.

The wrinkles 92 and the transition region 70 border a portion of second region 50, and thereby help to visually offset the second region 50 from the first region 30.

Referring to FIGS. 7 and 8, the second region 50 can comprise a plurality of discrete zones 54 (a single discrete zone 54 is shown in FIG. 8), where each discrete zone 54 corresponds to a web patterning element 280 such as those shown in FIG. 4. The first region 30 can comprise a continuous network, with a plurality of discrete zones 54 surrounded by the first region 30. Each discrete zone 54 is interconnected with the first region 30 by the transition region 70, discrete portions of which can encircle the discrete zones 54.

Adjacent discrete zones 54 can inscribe a plurality of circular zones C of the first region 30. One inscribed zone C is shown in FIG. 7. The projected area of some inscribed circular zones C are at least about 10, preferably about 20 and more preferably at least about 100 square millimeter. The spacing D between at least some adjacent discrete zones 54 of the second region 50 can be at least about 8 millimeters, and preferably at least about 10 times greater than the difference 62 between the first elevation 32 and the second elevation 52.

Referring to FIGS. 7 and 8, a plurality of the discrete zones 54 can enclose one or more discrete zones 130 corresponding to the openings 285 in a web patterning element 280. Each discrete, enclosed zone 130 can have an elevation 131 different from the second elevation 51 of the second region 50. Each of the enclosed zones 130 can have a creping pattern 135, as shown in FIGS. 5 and 8.

Figure 14:
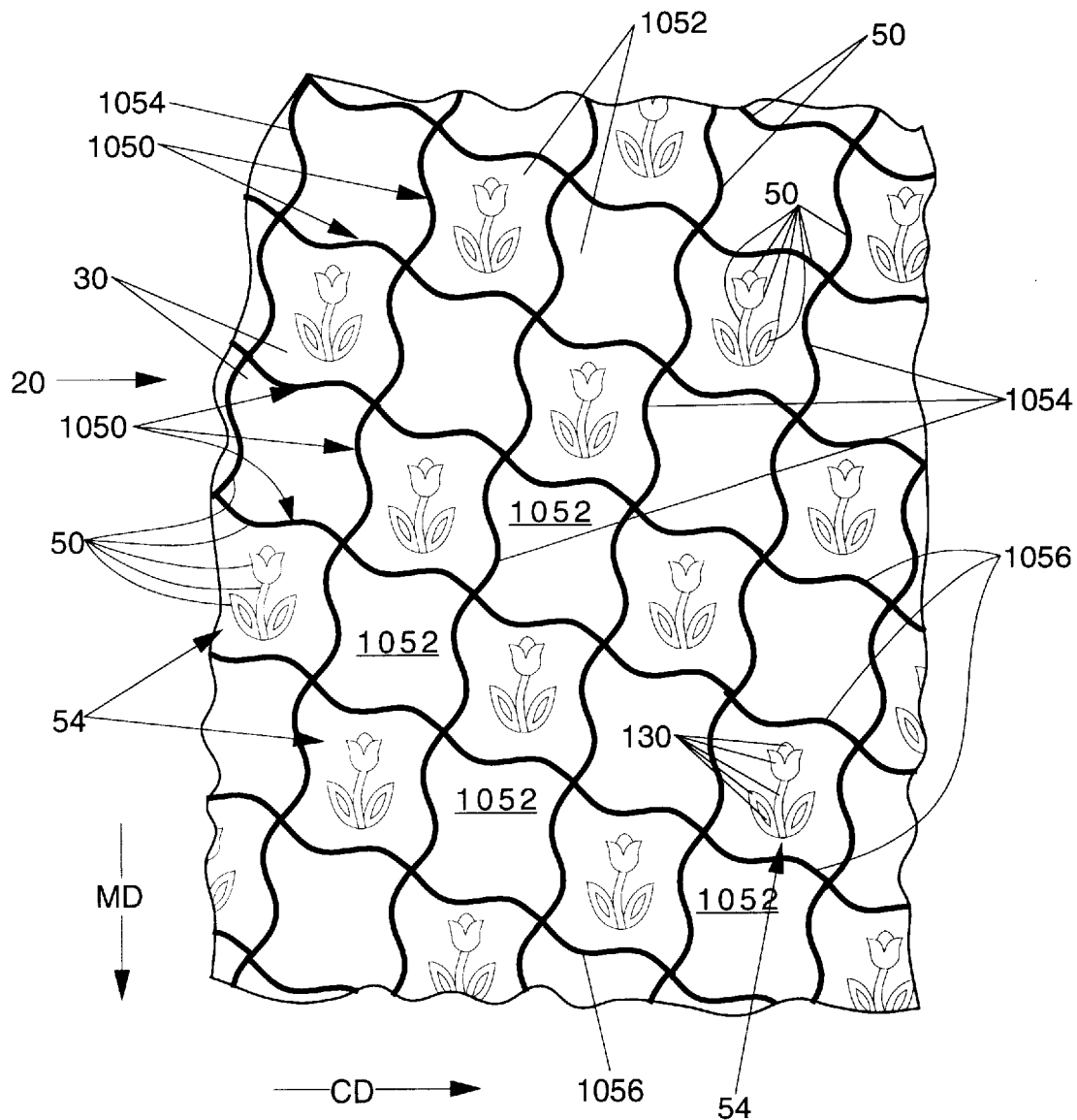
FIG. 14 is a plan view illustration of a paper structure made with the apparatus of FIG. 13.

FIG. 14 illustrates an alternative embodiment of a paper structure 20 according to the present invention. As shown in FIG. 14, the second region 50 can comprise a lattice network 1050 defining cells 1052, and a plurality of discrete zones 54. The discrete zones 54 can be disposed within at least some of the cells 1052 of the lattice network 1050.

The lattice network 1050 shown in FIG. 14 comprises spaced apart bands 1054 which intersect spaced apart bands 1056 to form the cells 1052. The bands 1054 and/or the bands 1056 can be unbroken, or alternatively, can be formed by a plurality of short, spaced apart segments. In FIG. 14 the bands 1054 and 1056 are unbroken. The bands 1054 extend generally in the machine direction, and the bands 1056 extend generally in the cross-machine direction. The intersecting, unbroken bands 1054 and 1056 thereby form a continuous network lattice 1050.

The paper structure 20 according to the present invention preferably has a basis weight of between about 7 pounds per 3000 square feet (about 11 gram/square meter) and about 35 pounds per 3000 square feet (57 gram/square meter), which basis weight range is desirable for providing paper structures 20 suitable for use bath tissue and facial tissue products. The basis weight of the paper structure 20 is measured by cutting eight single ply samples of the paper structure 20 conditioned at 73 degrees Fahrenheit and 50 percent relative humidity, each sample measuring 4 inches by 4 inches (0.0103 square meter). The eight 4 inch by 4 inch samples are placed one on top of each other and weighed to the nearest 0.0001 gram. The basis weight of the eight samples (in grams/square meter) is the combined weight of the eight samples in grams divided by the sample area of 0.0103 square meter. The basis weight of the paper structure 20 is obtained by dividing the combined basis weight of eight samples by eight.

Papermaking Method Description

A paper structure 20 according to the present invention can be made with the papermaking apparatus shown in FIGS. 9–11. Referring to FIG. 9, the method of making the paper structure 20 of the present invention is initiated by depositing a slurry of papermaking fibers from a headbox 500 onto a foraminous, liquid pervious forming member, such as a forming belt 542, followed by forming an embryonic web of papermaking fibers 543 supported by the forming belt 542. The forming belt 542 can comprise a continuous Fourdrinier wire, or alternatively, can be in the form of any of the various twin wire formers known in the art.

It is anticipated that wood pulp in all its varieties will normally comprise the paper making fibers used in this invention. However, other cellulose fibrous pulps, such as cotton liners, bagasse, rayon, etc., can be used and none are disclaimed. Wood pulps useful herein include chemical pulps such as Kraft, sulfite and sulfate pulps as well as mechanical pulps including for example, ground wood, thermomechanical pulps and Chemi-ThermoMechanical Pulp (CTMP). Pulps derived from both deciduous and coniferous trees can be used.

Both hardwood pulps and softwood pulps as well as blends of the two may be employed. The terms hardwood pulps as used herein refers to fibrous pulp derived from the woody substance of deciduous trees (angiosperms) wherein softwood pulps are fibrous pulps derived from the woody substance of coniferous trees (gymnosperms). Hardwood pulps such as eucalyptus having an average fiber length of about 1.00 millimeter are particularly suitable for tissue webs described hereinafter where softness is important, whereas northern softwood Kraft pulps having an average fiber length of about 2.5 millimeter are preferred where strength is required. Also applicable to the present invention are fibers derived from recycled paper, which may contain any or all of the above categories as well as other nonfibrous materials such as fillers and adhesives used to facilitate the original paper making.

The paper furnish can comprise a variety of additives, including but not limited to fiber binder materials, such as wet strength binder materials, dry strength binder materials, and chemical softening compositions. Suitable wet strength binders include, but are not limited to, materials such as polyamide-epichlorohydrin resins sold under the trade name of Kymene® 557H by Hercules Inc., Wilmington, Del. Suitable temporary wet strength binders include but are not limited to modified starch binders such as National Starch 78-0080 marketed by National Starch Chemical Corporation, New York, N.Y. Suitable dry strength binders include materials such as carboxymethyl cellulose and cationic polymers such as ACCO® 711. The ACCO® family of dry strength materials are available from American Cyanamid Company of Wayne, N.J. Suitable chemical softening compositions are disclosed in U.S. Pat. No. 5,279,767 issued Jan. 18, 1994 to Phan et al. Suitable biodegradable chemical softening compositions are disclosed in U.S. Pat. No 5,312,522 issued May 17, 1994 to Phan et al.

The embryonic web 543 is preferably prepared from an aqueous dispersion of papermaking fibers, though dispersions in liquids other than water can be used. The fibers are dispersed in the carrier liquid to have a consistency of from about 0.1 to about 0.3 percent. The percent consistency of a dispersion, slurry, web, or other system is defined as 100 times the quotient obtained when the weight of dry fiber in the system under consideration is divided by the total weight of the system. Fiber weight is always expressed on the basis of bone dry fibers.

The embryonic web 543 can be formed in a continuous papermaking process, as shown in FIG. 9, or alternatively, a batch process, such as a handsheet making process can be used. After the dispersion of papermaking fibers is deposited onto the forming belt 542, the embryonic web 543 is formed by removal of a portion of the aqueous dispersing medium by techniques well known to those skilled in the art. The embryonic web can be generally monoplanar. Vacuum boxes, forming boards, hydrofoils, and the like are useful in effecting water removal from the dispersion. The embryonic web 543 travels with the forming belt 542 about a return roll 502 and is brought into the proximity of the web support apparatus 200.

The next step in making the paper structure 20 comprises transferring the embryonic web 543 from the forming belt 542 to the web support apparatus 200 and supporting the embryonic web 543 on the first side 202 of the web support apparatus. The embryonic web preferably has a consistency of at least 8 percent at the point of transfer to the web support apparatus 200. The step of transferring the embryonic web 543 can simultaneously include the step of deflecting a portion of the web 543. Alternatively, the step of deflecting a portion of the web 543 can follow the step of transferring the web.

The steps of transferring the embryonic web 543 to the web support apparatus 200 and deflecting a portion of the embryonic web 543 can be provided, at least in part, by applying a differential fluid pressure to the embryonic web 543. For instance, the embryonic web 543 can be vacuum transferred from the forming belt 542 to the web support apparatus 200 by a vacuum source 600 depicted in FIG. 9, such as a vacuum shoe or a vacuum roll. One or more additional vacuum sources 620 can also be provided downstream of the embryonic web transfer point.

Referring to FIGS. 9 and 10, the step of deflecting the web 543 comprises deflecting a portion of the web 543 overlying the first felt surface 230 in a first deflection step to form a non-monoplanar web 545 having a first uncompacted web region 547 supported on the first web contacting surface 230, and a second uncompacted web region 549 supported on the web contacting surface 260. The first deflection step is preferably performed at a web consistency of between about 8 percent and about 30 percent, and more preferably at a web consistency of between about 8 percent and about 20 percent, so that deflection of the web takes place when the fibers of the web 543 are relatively mobile, and so that the deflection does not result in breaking of substantial numbers of fiber to fiber bonds. The pressure differential provided by the vacuum source 600 can be between about 10 to about 25 inches of mercury. U.S. Pat. No. 4,529,480 issued Jul. 16, 1985 to Trokhan is incorporated herein by reference for the purpose of teaching transfer and deflection of an embryonic web by applying a differential fluid pressure.

After transferring and deflecting the embryonic web 543 to form the non-monoplanar web 545, the web 545 is carried on the web support apparatus 200 hrough a nip 800 provided between a compaction surface 875 and a deformable compression surface 910 of a compression member shown in FIG. 11. The compression member can comprise a roller 900. The web 545 is carried through the nip 800 for positioning of the web 545 adjacent the compaction surface 875, and for positioning the second side 202 of the web support apparatus 200 adjacent the deformable compression surface 910. The web 545 preferably enters the nip 800 at a consistency of between about 20 percent and about 50 percent.

The compaction surface 875 is preferably characterized in having a relatively high hardness and in being relatively incompressible as compared to the deformable compression surface 910. A suitable surface 875 is the surface of a steel or iron heated dryer drum 880. The surface 875 can be coated with a creping adhesive dispensed from a spray nozzle 890 located upstream of the nip 800, or alternatively, by an impression roll (not shown). Alternatively, the creping adhesive can be applied to the pressed web 546 by any suitable means of glue application. A suitable creping adhesive is shown in U.S. Pat. No. 3,926,716 issued to Bates on Dec. 16, 1975, which patent is incorporated by reference.

Referring to FIG. 11, the roller 900 can have in inner core 902 and an outer layer 906. The roller 900 can have a diameter of about 1–3 feet, and the dryer drum 880 can have a diameter of about 12–18 feet. The deformable compression surface 910 is preferably located on a layer 906 formed from a material having a P&J hardness less than about 120 P&J and preferably between about 30 and about 100 P&J. In one embodiment, the inner core 902 can be formed from a material such as steel, and the outer layer 906 comprising the surface 910 can be formed from natural rubber or other generally elastomeric materials.

The roller 900 can compose a vacuum pressure roll. Suitable vacuum pressure rolls have a drilled or grooved surface 910 through which vacuum is applied to the back side 202 of the web support apparatus 200 to provide dewatering of the paper web in the nip 800. The vacuum applied ranges from about 0 to 15 inches of Mercury preferably between 3 and 12 inches of Mercury.

The next step in forming the paper structure 20 comprises pressing the web support apparatus 200 and the non-monoplanar web 545 between the compression surface 910 and the compaction surface 875 to provide a average nip compression pressure of at least about 100 psi and preferably at least about 200 psi. The nip pressure is the total force applied to the nip divided by the nip area. The total force applied to the nip can be determined from hydraulic gauge readings coupled with a force balance analysis based on the equipment geometry. The nip width is determined by loading the nip 900 with a sheet of white paper and a sheet of carbon paper positioned between the apparatus 200 and the surface 875, such that the carbon paper provides an impression of the nip width on the white paper.

Pressing the web support apparatus 200 and the web 545 in the nip 800 provides a second deflection step. The second deflection step comprises deflecting the first felt surface 230 relative to the web contacting top surface 260. In particular, the first web contacting surface 230 is deflected toward the compaction surface 875 by the deformable compression surface 910, as shown in FIG. 11, thereby temporarily reducing, and preferably temporarily substantially eliminating the difference in elevation 262 between a portion of the first felt surface 230 and the surface 260.

Deflecting the first web contacting surface 230 relative to the second web contacting surface 260 provides deflection of the first uncompacted web region 547 relative to the second uncompacted web region 549, thereby temporarily reducing the difference in elevation between the first and second web regions 547 and 549. In particular, a portion of the first web region 547 is deflected toward the compaction surface 875 by the first felt surface 230, to thereby temporarily substantially eliminate the difference in elevation between the first and second uncompacted web regions 547 and 549. The second deflection step is preferably performed at a web consistency of between about 20 percent and about 80 percent, and more preferably at a web consistency of between about 30 percent and about 70 percent.

Pressing the web support apparatus 200 and the web 545 in the nip 800 also provides a web compaction step. Compacting a region of a web reduces the thickness of that region of the web. The web compaction step comprises the step of compacting a portion of the first generally uncompacted web region 547 against the compaction surface 875 to form a first compacted web region 530, and compacting at least a portion of the second uncompacted web region 549 against the compaction surface 875 to form a second compacted web region 550. In particular, the web region 547 is compacted between the first felt surface 230 and the compaction surface 875, and the web region 549 is compacted between the web contacting top surface 260 of the web patterning layer 250 and the compaction surface 875. The difference in elevation between the first and second compacted web regions 530 and 550 is essentially zero at the end of the compaction step, as both of the regions 530 and 550 are pressed into engagement with the compaction surface 875 of the dryer drum 880, as shown in FIG. 11.

Relative deflection of the first felt surface 230 and the web contacting top surface 260 of the web imprinting layer 250 in the second deflection step is accomplished with a web support apparatus 200 and compression surface 910 having a combination of desired characteristics. One characteristic that enables such relative deflection is the bending flexibility of the web support apparatus 200.

The bending flexibility of the web support apparatus 200 is a function of the flexibility of the dewatering felt layer 220 and the stiffness imparted to the apparatus 200 by the web patterning layer 250. The web support apparatus 200 having a web patterning layer 250 with top surface 260 having the above described projected area and disposed to inscribe large portions of the felt surface 230 is relatively flexible compared to a structure having a larger percentage of its surface covered by resin. Such flexibility permits the deflection of the first felt surface 230 relative to the surface 260. In addition, spacing between adjacent web patterning elements 280 which is large relative to the elevation difference 262 reduces the bending stiffness of the felt layer 220 intermediate the elements 280, and permits the felt layer 220 intermediate the elements 280 to be deflected so that the first uncompacted web region 547 can be pressed into engagement with the compaction surface 875.

Another factor which affects relative deflection of the surfaces 230 and 260 is the hardness of the web patterning layer 250. A resin having a low hardness when cured will be compressed to some degree in the nip 800, thereby reducing the difference in elevation between the surfaces 260 and 230. Relative deflection of the surfaces 230 and 260 is also enhanced by reducing the hardness of the compression surface 910. A relatively low hardness compression surface 910 can conform to the second felt surface 232, and thereby provide a compressive load intermediate the web patterning elements 280 to press the first felt surface 230 and the first uncompacted web region 547 toward the compaction surface 875.

Yet another factor which affects the relative deflection of the surfaces 230 and 260 is the degree of penetration of the web patterning layer 250 through the thickness of the felt layer 220. In general, a web patterning 250 that extends through less than about half the thickness of felt layer 220 is desirable to enhance relative deflection of surfaces 230 and 260.

The step of compacting the first and second uncompacted web regions 547 and 549 to form the compacted web regions 530 and 550 preferably also comprises the step of adhering at least a portion of the first and second compacted web regions 530 and 550 to the compaction surface 875, as shown in FIG. 11. The compacted web regions 530 and 550 can be adhered to the surface 875 by the creping adhesive applied to the surface 875 by the nozzle 890. After the compaction step, the web is dried on the heated surface 875 to have a consistency of greater than about 85 percent.

The final step in forming the paper structure 20 comprises restoring at least some of the difference in elevation between the web regions 547 and 549 lost in the second deflection step. This restoring step provides the first region 30 at the first elevation 32 (corresponding to the first compacted web region 530), the second region 50 at the second elevation 52 (corresponding to the second compacted web region 550).

The step of restoring some of the difference in web elevation lost in the second deflection step preferably comprises releasing the web from the compaction surface 875. In a preferred embodiment the step of restoring some of the difference in web elevation comprises foreshortening the web concurrently with the step of releasing the web from the compaction surface 875. Preferably, the step of releasing and foreshortening the web comprises the step of creping the web from the surface 875 with a doctor blade 1000, as shown in FIG. 9.

As used herein, foreshortening refers to the reduction in length of the web which occurs when energy is applied to the dry web in such a way that the length of the web is reduced in the machine direction. Foreshortening can be accomplished in any of several ways. The most common and preferred way to foreshorten a web is by creping. The web adhered to the compaction surface 875 is removed from the surface 875 by the doctor blade 1000. In general, the doctor blade has a bevel angle of about 25 degrees and is positioned with respect to the Yankee dryer to provide an impact angle of about 81 degrees.

ANALYTICAL PROCEDURES

Measurement of Thickness and Elevation

The thicknesses and elevations of various regions 30–70 of a sample of the fibrous structure 20 are measured from microtomes made from cross-sections of the paper structure 20. A sample measuring about 2.54 centimeters by 5.1 centimeters (1 inch by 2 inches) is provided and stapled onto a rigid cardboard holder. The cardboard holder is placed in a silicon mold. The paper sample is immersed in a resin such as Merigraph photopolymer manufactured by Hercules, Inc.

The sample is cured to harden the resin mixture. The sample is removed from the silicon mold. Prior to immersion in photopolymer the sample is marked with a reference point to accurately determine where microtome slices are made. Preferably, the same reference point is utilized in both the plan view and various sectional views of the sample of the fibrous structure 20.

The sample is placed in a model 860 microtome sold by the American Optical Company of Buffalo, New York and leveled. The edge of the sample is removed from the sample, in slices, by the microtome until a smooth surface appears.

A sufficient number of slices are removed from the sample, so that the various regions 30–70 may be accurately reconstructed. For the embodiment described herein, slices having a thickness of about 60 microns per slice are taken from the smooth surface. Multiple slices may be required so that the thicknesses 31, 51, and 71 may be ascertained.

Figure 6A:
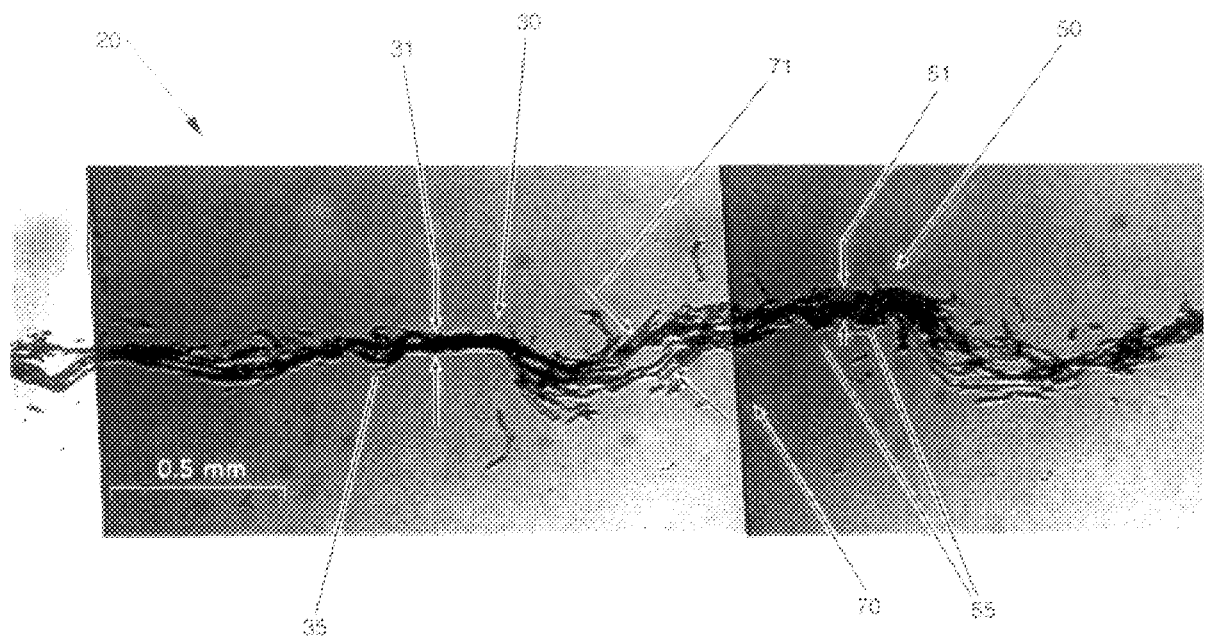
FIG. 6A is a photomicrograph of a cross-section of a paper structure according to the present invention.
Figure 6B:
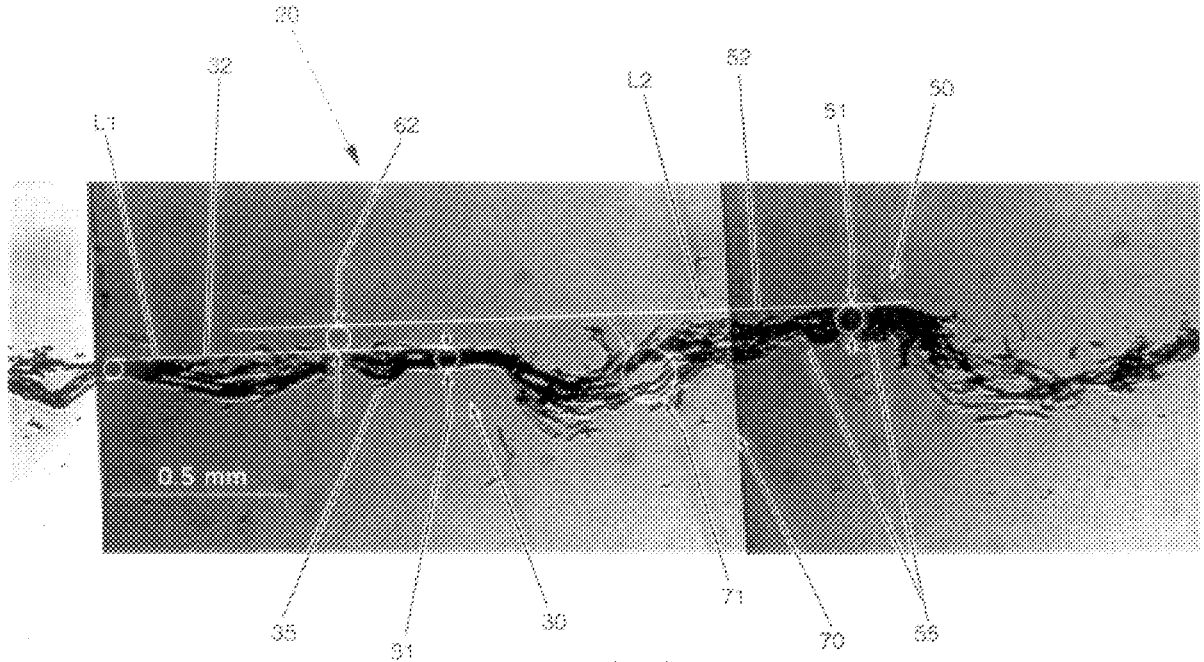
FIG. 6B is the photomicrograph of 6A showing elevation reference lines.

A sample slice is mounted on a microscope slide using oil and a cover slip. The slide and the sample are mounted in a light transmission microscope and observed at about 40× magnification. Photomicrographs are taken along the slice, and the individual photomicrographs are arranged in series to reconstruct the profile of the slice. The thicknesses and elevations may be ascertained from the reconstructed profile, as shown in FIGS. 6A and 6B. By knowing the relative basis weights of individual regions, as well as the corresponding thicknesses of the individual regions, the density of the individual regions can be ascertained. U.S. Pat. No. 5,277,761 issued Jan. 11, 1994 in the name of Phan et al. is incorporated herein by reference for describing the micro basis weight of individual regions of a paper structure.

The thickness between regions 31–71 may be established by using Hewlett Packard ScanJet IIC color flatbed scanner. The Hewlett Packard Scanning software is DeskScan II version 1.6. The scanner settings type is black and white photo. The path is LaserWriter NT, NTX. The brightness and contrast setting is 125. The scaling is 100%. The file is scanned and saved in a picture file format on a Macintosh IICi computer. The picture file is opened with a suitable photo-imaging software package or CAD program, such as PowerDraw version 5.0.

Referring to FIG. 6B, the thickness of each region can be determined by drawing a circle which is inscribed by the region. The thickness of the region at that point is the diameter of the smallest circle that can be drawn in the region (in the microtome sample), multiplied by the appropriate scale factor. The scale factor is the magnification of the photomicrograph multiplied by the magnification of the scanned image. The circle can be drawn using any appropriate software drawing package, such as PowerDraw, version 5.0, available from Engineered Software of North Carolina. The difference in elevation 62 is measured by drawing the smallest circle inscribed by region 50 (in the microtome sample), and by drawing two circles inscribed by region 30, as shown in FIG. 6B. A first line L1 is drawn tangent to the two circles inscribed by region 30. A second line L2 is drawn parallel to the first line L1 and tangent to circle inscribed by region 50. The distance between the first and second lines, multiplied by the appropriate scale factor, is the difference in elevation 62.

Projected Area Measurement

The projected area of the web contacting surface 260 is measured according to the following procedure. First, the web contacting surface 260 is darkened with a black marker (Sanford Sharpie) to increase the contrast. Second, three digitized images of the web patterning apparatus 200 are acquired using a Hewlett Packard ScanJet IIc Flatbed scanner. The scanner options are set as follows: Brightness 198, contrast 211, black and white photo resolution 100 DPI, scaling 100%. Third, the percentage of the projected area of the web support apparatus 200 comprising the web contacting surface 260 is determined using a suitable image analysis software system such as Optimas available from Bioscan, Incorporated, Edmonds, Wash. The ratio of the number of pixels having a greyscale value between 0 and 62 (corresponding to the web contacting surface 260) is divided by the total number of pixels in the scanned image (times 100) to determine the percentage of the projected area of the web support apparatus 200 comprising the web contacting surface 260.

Measurement of Web Support Apparatus Elevations

The elevation difference 262 between the elevation 231 of the first felt surface and the elevation 261 of the web contacting surface 260 is measured using the following procedure. The web support apparatus is supported on a flat horizontal surface with the web patterning layer facing upward. A stylus having a circular contact surface of about 1.3 square millimeters and a vertical length of about 3 millimeters is mounted on a Federal Products dimensioning gauge (model 432B-81 amplifier modified for use with an EMD-4320 WI breakaway probe) manufactured by the Federal Products Company of Providence, R.I. The instrument is calibrated by determining the voltage difference between two precision shims of known thickness which provide a known elevation difference. The instrument is zeroed at an elevation slightly lower than the first felt surface 230 to insure unrestricted travel of the stylus. The stylus is placed over the elevation of interest and lowered to make the measurement. The stylus exerts a pressure of 0.24 grams/square millimeter at the point of measurement. At least three measurements are made at each elevation. The difference in the average measurements of the individual elevations 231 and 261 is taken as the elevation difference 262.

Measurement of P&J Hardness

The surface hardness of the roll 900 is measured using a P&J plastometer Model 2000 manufactured by Dominion Engineering Works LTD of Lachine, Quebec, Ontario. The indentor shaft has a 3.17 millimeter ball. The hardness is taken at three different positions: One in the middle of the roll, one 6 inches from one end of the roll, and one 6 inches from the other end of the roll. The P&J hardness is the average of these three readings. The readings are made with the roll conditioned at a temperature of 21 degrees Celsius following the procedure provided by the manufacturer of the plastometer.

What is claimed:

1. A method of forming a dewatering felt having a web patterning layer, the method comprising the steps of:

provinding a dewatering felt capable of receiving and containing water pressed from a web of papermaking fibers, the dewatering felt having a first surface and a second oppositely facing surface;

providing a liquid photosensitive resin;

providing a source of actinic radiation;

applying a liquid photosensitive resin to the first surface of the dewatering felt;

exposing at least some of the liquid photosensitive resin on the first surface of the dewatering felt to the actinic radiation;

curing at least some of the photosensitive resin to provide a resin layer having a predetermined pattern and extending from the first surface of the dewatering felt; and removing uncured liquid resin from the felt.

2. The method of claim 1 wherein the step of curing at least some of the photosensitive resin comprises curing photosensitive resin between the first felt surface and the second felt surface to provide a cured resin layer which penetrates the first felt surface.

3. The method of claim 1 wherein the step of curing the photosensitive resin comprises curing the resin between the first felt surface and the second felt surface to provide a cured resin layer extending through less than about half the thickness of the felt layer.

4. The method of claim 1 wherein the step of providing a dewatering felt comprises providing a dewatering felt having an air permeability of between about 5 and about 200 scfm.

5. The method of claim 1 wherein the step of providing a dewatering felt comprises providing a dewatering felt having a water holding capacity of at least about 100 mg/square cm.

6. The method of claim 1 wherein the step of providing a dewatering felt comprises providing a dewatering felt having a small pore capacity of at least about 25 mg/square cm.

7. A method of forming a dewatering felt having a web patterning layer, the method comprising the steps of:

provide a dewatering felt capable of receiving and containing water pressed from a web of papermaking fibers, the dewatering felt having a first surface and a second oppositely facing surface;

providing a liquid photosensitive resin;

providing a source of actinic radiation;

providing a mask comprising regions opaque to the radiation and regions transparent to the radiation;

applying a coating of liquid photosensitive resin to the first surface of the dewatering felt;

positioning the mask between the source of radiation and the coating of liquid photosensitive resin;

exposing the coating of liquid photosensitive resin to the actinic radiation through the mask to induce curing of the photosensitive resin in registration with the transparent regions in the mask; and removing uncured photosensitive resin from the dewatering felt.

8. The method of claim 7 wherein the step of removing the uncured photosensitive resin comprises washing the dewatering felt with a mixture comprising water and a surfactant.

9. The method of claim 8 wherein the step of exposing the liquid photosensitive resin to the actinic radiation comprises exposing the liquid photosensitive resin to actinic radiation prior to washing the dewatering felt with the mixture comprising water and a surfactant to partially cure the resin, and exposing the liquid photosensitive resin to actinic radiation in a post cure step after washing the dewatering felt with water and surfactant mixture.

10. The method of claim 9 further comprising the step of rinsing the dewatering felt to remove the surfactant prior to the post cure step.

11. A method of forming a dewatering felt having a web patterning layer, the method comprising the steps of:

providing a dewatering felt capable of receiving and containing water pressed from a web of papermaking fibers, the dewatering felt comprising a nonwoven batt of fibers joined to a support structure, and the dewatering felt having a first surface and a second oppositely facing surface;

providing a liquid photosensitive resin;

providing a source of actinic radiation;

providing a mask comprising regions opaque to the radiation and regions transparent to the radiation;

applying a coating of liquid photosensitive resin to the first surface of the dewatering felt;

positioning the mask between the source of radiation and the coating of liquid photosensitive resin;

curing at least some of the photosensitive resin in registration with the transparent regions in the mask to provide the web patterning layer; and removing uncured liquid resin from the felt.

12. The method of claim 11 wherein the step of providing a dewatering felt comprises providing a dewatering felt having an air permeability of between about 5 and about 200 scfm.

13. The method of claim 11 wherein the step of providing a dewatering felt comprises providing a dewatering felt having a water holding capacity of at least about 100 mg/square cm.

14. The method of claim 11 wherein the step of providing a dewatering felt comprises providing a dewatering felt having a small pore capacity of at least about 25 mg/square cm.

* * * * *